(12) United States Patent  
Mori

(10) Patent No.: US 8,305,616 B2
(45) Date of Patent: Nov. 6, 2012

(54) INFORMATION PROCESSING APPARATUS, INFORMATION PROCESSING METHOD, AND STORAGE MEDIUM

(75) Inventor: Yasuo Mori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 643 days.

(21) Appl. No.: 12/490,854

(22) Filed: Jun. 24, 2009

(65) Prior Publication Data

US 2009/0323109 A1   Dec. 31, 2009

(30) Foreign Application Priority Data

Jun. 25, 2008  (JP) ................. 2008-166164

(51) Int. Cl.
G06F 15/00 (2006.01)
(52) U.S. Cl. ..................................... 358/1.15
(58) Field of Classification Search .................. 358/1.15
See application file for complete search history.

(56) References Cited

U.S. PATENT DOCUMENTS

| | | | |
|---|---|---|---|
| 5,978,557 A | 11/1999 | Kato | 395/114 |
| 6,760,118 B1 | 7/2004 | Kato | 358/1.15 |
| 6,760,120 B2 | 7/2004 | Kato | 358/1.15 |
| 7,916,327 B2 | 3/2011 | Yamaguchi | |
| 2003/0159114 A1* | 8/2003 | Nishikawa et al. | 715/530 |
| 2004/0133856 A1 | 7/2004 | Miyazato et al. | |
| 2005/0243371 A1 | 11/2005 | Kanaya et al. | |
| 2005/0289460 A1 | 12/2005 | Tomita et al. | |
| 2006/0171002 A1 | 8/2006 | Mori | |
| 2007/0229880 A1* | 10/2007 | Harmon et al. | 358/1.15 |
| 2007/0229904 A1 | 10/2007 | Mori | |

FOREIGN PATENT DOCUMENTS

| | | |
|---|---|---|
| JP | 9-265362 | 10/1997 |
| JP | 2006-305760 A | 11/2006 |
| JP | 2007-164422 A | 6/2007 |

* cited by examiner

*Primary Examiner* — Saeid Ebrahimi Dehkordy
(74) *Attorney, Agent, or Firm* — Fitzpatrick Cella Harper & Scinto

(57) ABSTRACT

An information processing apparatus sets print setting information applied to a document upon printing and finishing information applied to a printed matter of the document and designates a first printing apparatus for executing the printing. In the case where the first printing apparatus can execute a process regarding the set finishing information, the information processing apparatus transmits print data including the print setting information and the finishing information to the first printing apparatus. In the case where the first printing apparatus cannot execute the process regarding the finishing information, the information processing apparatus designates a second printing apparatus for executing the process regarding the finishing information, transmits the print data including the print setting information to the first printing apparatus and transmits the print data including the finishing information to the second printing apparatus.

3 Claims, 24 Drawing Sheets

FIG. 5

| NO | ATTRIBUTE INFORMATION | | REMARKS |
|---|---|---|---|
| 1 | PRINTING METHOD | SIMPLEX/DUPLEX/BOOKLET PRINTING | |
| 2 | SHEET SIZE | ORIGINAL SIZE/FIXED SIZE | • WHEN "A4+A3", "B4+B3" "LETTER+LEISURE (11×17)" IS DESIGNATED, Z-FOLDING IS DESIGNATED.<br>• WHEN BOOKLET PRINTING OR N-up PRINTING IS DESIGNATED, ORIGINAL SIZE OF 1st CHAPTER/THE 1st PAGE IS AUTOMATICALLY SELECTED. |
| 3 | SHEET DIRECTION | PORTRAIT/LANDSCAPE | • CAN BE SELECTED ONLY IN THE CASE OF FIXED SIZE. |
| 4 | BINDING MARGIN/ BINDING DIRECTION | | • SHIFT/DESIGNATION OF ENLARGEMENT OR REDUCTION CAN BE DESIGNATED. |
| 5 | N-up PRINTING | PAGES/LAYOUT ORDER/BOUNDARY LINE/LAYOUT POSITION, ETC. | • THERE ARE 9 PATTERNS AS LAYOUT POSITION.<br>• DIRECT PRINTING CAN BE DESIGNATED. |
| 6 | ENLARGEMENT/ REDUCTION | ON/OFF | • WHEN FIXED SIZE IS SELECTED AS SHEET SIZE OR N-up PRINTING IS SELECTED, THIS MODE IS AUTOMATICALLY DESIGNATED TO ON. IT CAN BE ALSO DESIGNATED TO OFF. |
| 7 | WATERMARK | | • CAN BE INDIVIDUALLY DESIGNATED ON A LOGICAL PAGE UNIT BASIS OR A PHYSICAL PAGE UNIT BASIS.<br>• ALL CHAPTERS/ALL PAGES ARE TARGETS. |
| 8 | HEADER/FOOTER | | • CAN BE INDIVIDUALLY DESIGNATED ON A LOGICAL PAGE UNIT BASIS OR A PHYSICAL PAGE UNIT BASIS.<br>• ALL CHAPTERS/ALL PAGES ARE TARGETS. |
| 9 | DISCHARGING METHOD | STAPLE/PUNCH HOLE | • STAPLE/PUNCH IS EFFECTIVE ONLY IN SIMPLEX/DUPLEX PRINTING.<br>• STAPLE IS PERFORMED AT 1 POSITION/2 POSITIONS. |
| 10 | BOOKLET DETAILS | OPENING DIRECTION/MIDDLE BINDING/ DESIGNATION OF ENLARGEMENT OR REDUCTION/BINDING/MARGIN/DESIGNATION OF VOLUME SEPARATION, ETC. | • ONLY IN BOOKLET PRINTING. |
| 11 | COVER/BACK COVER | | • PRINTING FOR COVER 1/2 OR BACK COVER 1/2 IS DESIGNATED.<br>• FEEDING PORT (INCLUDING INSERTER) IS DESIGNATED. |
| 12 | INDEX PAPER | | • PRINTING OF CHARACTER STRING TO INDEX PORTION OR ANNOTATION ONTO INDEX PAPER CAN BE SET.<br>• BOOKLET PRINTING CANNOT BE DESIGNATED. |
| 13 | INSERT SHEET | | • FEEDING PORT (INCLUDING INSERTER) IS DESIGNATED.<br>• ORIGINAL DATA CAN BE PRINTED TO INSERTED SHEET.<br>• BOOKLET PRINTING CANNOT BE DESIGNATED. |
| 14 | CHAPTER PUNCTUATION | "NONE"/"PAGE CHANGE"/ "SHEET CHANGE" | • WHEN INDEX PAPER OR INSERT SHEET IS DESIGNATED, "SHEET CHANGE" IS FIXED.<br>• IN SIMPLEX PRINTING, "SHEET CHANGE" IS SET. |

FIG. 6

| NO | ATTRIBUTE INFORMATION | | REMARKS |
|---|---|---|---|
| 1 | SHEET SIZE | ORIGINAL SIZE / FIXED SIZE | · WHEN FIXED SIZE IS SELECTED, "SHEET CHANGE" IS AUTOMATICALLY DESIGNATED.<br>· WHEN A PLURALITY OF SHEETS ARE SELECTED IN BOOK, SHEET SIZE CAN BE CHANGED ONLY IN DESIGNATED SHEET. WHEN SIZE IS DESIGNATED ACCORDING TO BOOK, SHEET SIZE CAN BE ALSO CHANGED. |
| 2 | SHEET DIRECTION | PORTRAIT/LANDSCAPE | · CAN BE SELECTED ONLY AT FIXED SIZE. |
| 3 | DESIGNATION OF N-up PRINTING | PAGES/LAYOUT ORDER/BOUNDARY LINE/LAYOUT POSITION, ETC. | · THERE ARE 9 PATTERNS AS LAYOUT POSITION.<br>· DIRECT PRINTING CAN BE DESIGNATED. |
| 4 | ENLARGEMENT/ REDUCTION | ON/OFF | · WHEN FIXED SIZE IS SELECTED AS SHEET SIZE OR N-up PRINTING IS SELECTED, THIS MODE IS AUTOMATICALLY DESIGNATED TO ON. IT CAN BE ALSO DESIGNATED TO OFF. |
| 5 | WATERMARK | DISPLAY/NON-DISPLAY | · MODE IN WHICH ALL WATERMARKS DESIGNATED BY BOOK ARE DISPLAYED OR NOT IS DESIGNATED. |
| 6 | HEADER/FOOTER | DISPLAY/NON-DISPLAY | · MODE IN WHICH ALL HEADERS/FOOTERS DESIGNATED BY BOOK ARE DISPLAYED OR NOT IS DESIGNATED. |
| 7 | DISCHARGING METHOD | STAPLE | · WHEN STAPLE IS DESIGNATED BY BOOK, THIS ITEM CAN BE SET TO OFF. IT IS ON AS DEFAULT. |

FIG. 7

| NO | ATTRIBUTE INFORMATION | | REMARKS |
|---|---|---|---|
| 1 | DESIGNATION OF PAGE ROTATION | | · 0/90/180/270° CAN BE DESIGNATED. |
| 2 | WATERMARK | DISPLAY/NON-DISPLAY | · MODE IN WHICH ALL WATERMARKS DESIGNATED BY BOOK ARE DISPLAYED OR NOT IS DESIGNATED. |
| 3 | HEADER/FOOTER | DISPLAY/NON-DISPLAY | · MODE IN WHICH ALL HEADERS/FOOTERS DESIGNATED BY BOOK ARE DISPLAYED OR NOT IS DESIGNATED. |
| 4 | ZOOM | 50%–200% | · RELATIVE MAGNIFICATION IN WHICH SIZE FITTED TO VIRTUAL LOGICAL PAGE REGION IS SET TO 100% IS DESIGNATED. |
| 5 | LAYOUT POSITION | | · FIXED 9 PATTERNS AND ARBITRARY POSITION ARE DESIGNATED. |
| 6 | ANNOTATION | | |
| 7 | VARIABLE ITEM | | |
| 8 | PAGE DIVISION | | |

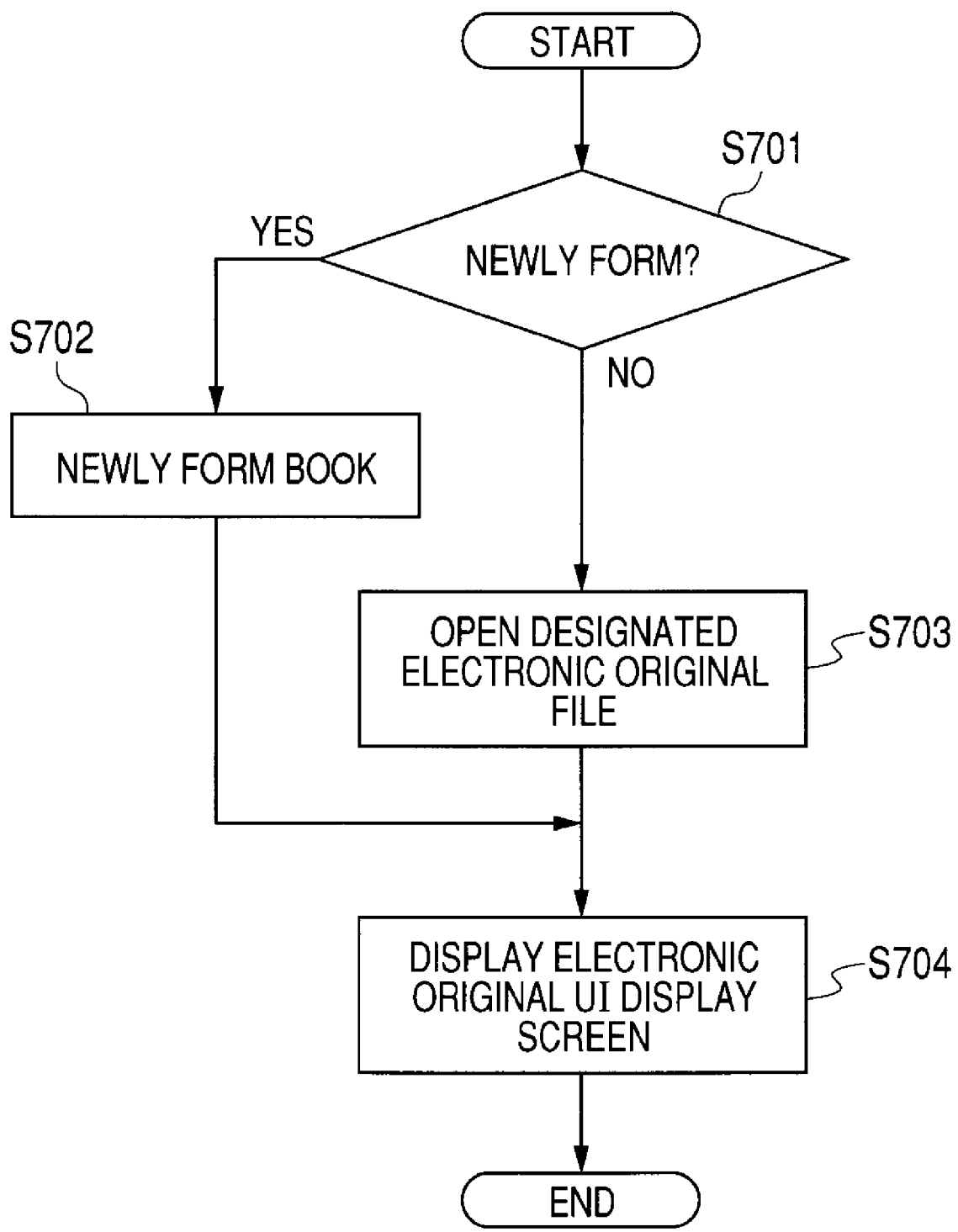

FIG. 19

| CATEGORY | PERMISSION/INHIBITION OF OFFLINE |
| --- | --- |
| PUNCH | YES |
| STAPLE | YES |
| FOLDING | YES |
| SADDLE STITCH | YES |
| SADDLE TRIMMER | YES |
| CASE BINDING | YES |
| INSERTER | YES |
| INSERTION OF TAB PAPER | NO |
| DUPLEX PRINTING | NO |

FIG. 20

| | | STAPLE | PUNCH | MIDDLE BINDING | CASE | CUTTING | TRIMMING |
|---|---|---|---|---|---|---|---|
| INLINE STAPLER | PRE-PROCESS | NO | YES | NO | NO | YES | YES |
| | POST-PROCESS | NO | YES | NO | NO | NO | YES |
| OFFLINE STAPLER | PRE-PROCESS | NO | YES | NO | NO | YES | YES |
| | POST-PROCESS | NO | YES | NO | NO | NO | YES |
| NEAR-LINE PUNCH A | PRE-PROCESS | YES | NO | YES | YES | YES | YES |
| | POST-PROCESS | YES | YES | NO | YES | NO | YES |
| NEAR-LINE PUNCH B | PRE-PROCESS | NO | NO | NO | NO | YES | YES |
| | POST-PROCESS | YES | NO | NO | YES | NO | YES |

FIG. 21

| | | STAPLE | PUNCH | MIDDLE BINDING | CASE | CUTTING | TRIMMING | C-FOLDING |
|---|---|---|---|---|---|---|---|---|
| INLINE STAPLER | PRE-PROCESS | NO | YES | NO | NO | YES | YES | — |
| | POST-PROCESS | NO | YES | NO | NO | NO | YES | — |
| OFFLINE STAPLER | PRE-PROCESS | NO | YES | NO | NO | YES | YES | — |
| | POST-PROCESS | NO | YES | NO | NO | NO | YES | — |
| C-FOLDING | PRE-PROCESS | NO | YES | NO | NO | YES | YES | NO |
| | POST-PROCESS | NO | NO | NO | NO | NO | NO | NO |

INFORMATION PROCESSING APPARATUS, INFORMATION PROCESSING METHOD, AND STORAGE MEDIUM

BACKGROUND OF THE INVENTION

1. Field of the Invention

The invention relates to an information processing apparatus, an information processing method, and a program.

2. Description of the Related Art

There is a document processing system in which document data is converted into data of an intermediate format and the converted data of the intermediate format is fetched into one document, thereby collectively processing a plurality of kinds of data without limiting applications for editing and forming various kinds of data.

In such a document processing system, since the data formed by a plurality of applications is held in the intermediate format, for example, an addition of page numbers and a change in page order can be easily realized. Further, in the document processing system, a finishing setting such as staple, punch, or the like can be also executed. Therefore, for example, by applying a finisher function which a printer option has to a document which is obtained by electronically merge-processing the data formed every various kinds of applications, the document can be stapled.

Further, in the document processing system, ability information which a printer for executing printing has is obtained and whether or not a designation of the finishing can be realized before the start of the printing can be discriminated by using the obtained printer ability information. Therefore, for example, such a mistake that although the staple and punch had been designated, only the punch could be performed as a result of the printing can be checked prior to starting the printing. Consequently, such a situation that a printed matter of a format which is not desired by the user is formed is prevented and such a situation that a time and costs are wastefully consumed by a misprint can be avoided.

However, in the document processing system in the related art, whether or not the setting of the finishing can be realized by using only the ability held in the printer for executing the printing is discriminated. Therefore, even if it is intended to realize the setting by using a plurality of devices, when the printer for executing the printing does not have a necessary function, print setting information showing use of such a function cannot be set.

Or, even in the case where the print setting can be performed, the document processing system copes with such a situation by changing setting contents to only the functions held in the printer for executing the printing. For example, when the user intends to form a document to which a Z-folding and the staple have been applied, if the printer for executing the printing has only the staple function, the document processing system cancels the setting of the Z-folding which is not held in the printer for executing the printing. In such a case, even if it is intended to realize the Z-folding by a folding machine, since the document has already been bound by the stapler, the document cannot be processed by the folding machine. The user folds it by manual work or after the stapler was temporarily removed, the document is processed by the folding machine and is stapled after that, so that it causes a deterioration in productivity.

To prevent such a problem, the user decides a range of settings to be executed for the printer for executing the printing and applies only the decided setting items to the document. Therefore, since the user needs a skill to decide the setting items and the decision of the setting items and the application to the document are the manual work, such a failure that the document is printed without setting the necessary setting items occurs.

According to the foregoing technique disclosed in Japanese Patent Application Laid-open No. H09-265362, a discrimination about a color and a monochromatic color (characteristics of a page) is made page by page, a color flag is turned on/off, and a printer on a transmission destination side is switched to either a color printer or a monochromatic printer based on the on/off state of the color flag. Further, according to the technique of the Patent Document 1 mentioned above, a dummy page is inserted into a portion where there is a page printed to the other printer so that a merge process of an output matter distributed to two printers can be easily performed.

However, Japanese Patent Application Laid-open No. H09-265362 is a system in which a device which can be executed is simply selected by paying an attention to specific setting items. Therefore, in the case of the example of the staple and the Z-folding, according to the related art, such a problem that if the staple was performed by the printer, the Z-folding cannot be performed in a post-process cannot be prevented.

The invention is made in consideration of such a problem and it is an object of the invention to allow a process regarding a print setting to be efficiently executed by a plurality of devices.

SUMMARY OF THE INVENTION

To solve the above problems, according to the invention, there is provided an information processing apparatus comprising: a setting unit that sets print setting information applied to a document upon printing and finishing information applied to a printed matter of the document; a designating unit that designates a first printing apparatus in order to execute the printing; a transmitting unit that, in the case where the first printing apparatus designated by the designating unit can execute a process regarding the finishing information set by the setting unit, transmits print data including the print setting information and the finishing information to the first printing apparatus; and a second designating unit that, in the case where the first printing apparatus cannot execute the process regarding the finishing information set by the setting unit, designates a second printing apparatus for executing the process regarding the finishing information, wherein the transmitting unit transmits the print data including the print setting information to the first printing apparatus and transmits the print data including the finishing information to the second printing apparatus.

Further features of the present invention will become apparent from the following description of exemplary embodiments with reference to the attached drawings.

BRIEF DESCRIPTION OF DRAWINGS

FIG. 5 is a diagram illustrating an example of a list of book attributes (document setting information 403).

FIG. 6 is a diagram illustrating an example of a list of chapter attributes (chapter setting information 407).

FIG. 7 is a diagram illustrating an example of page attributes (page setting information 411).

FIG. 8 is a flowchart illustrating an example of processes at the time when the book file is opened by a booklet application 104.

FIG. 19 is a conceptual diagram of an example of a finishing ability table prepared by a system which is referred to in step S23 in FIG. 14.

FIG. 20 is a diagram illustrating an example of ability information obtained by the host computer 100 from the device in step S10 in FIG. 13.

FIG. 21 is a diagram illustrating an example of device ability information obtained by the host computer 100 in the case where the number of new finishing kinds is increased.

DESCRIPTION OF THE EMBODIMENTS

Embodiments of the invention will be described hereinbelow with reference to the drawings.

Embodiment 1

Figure 1:
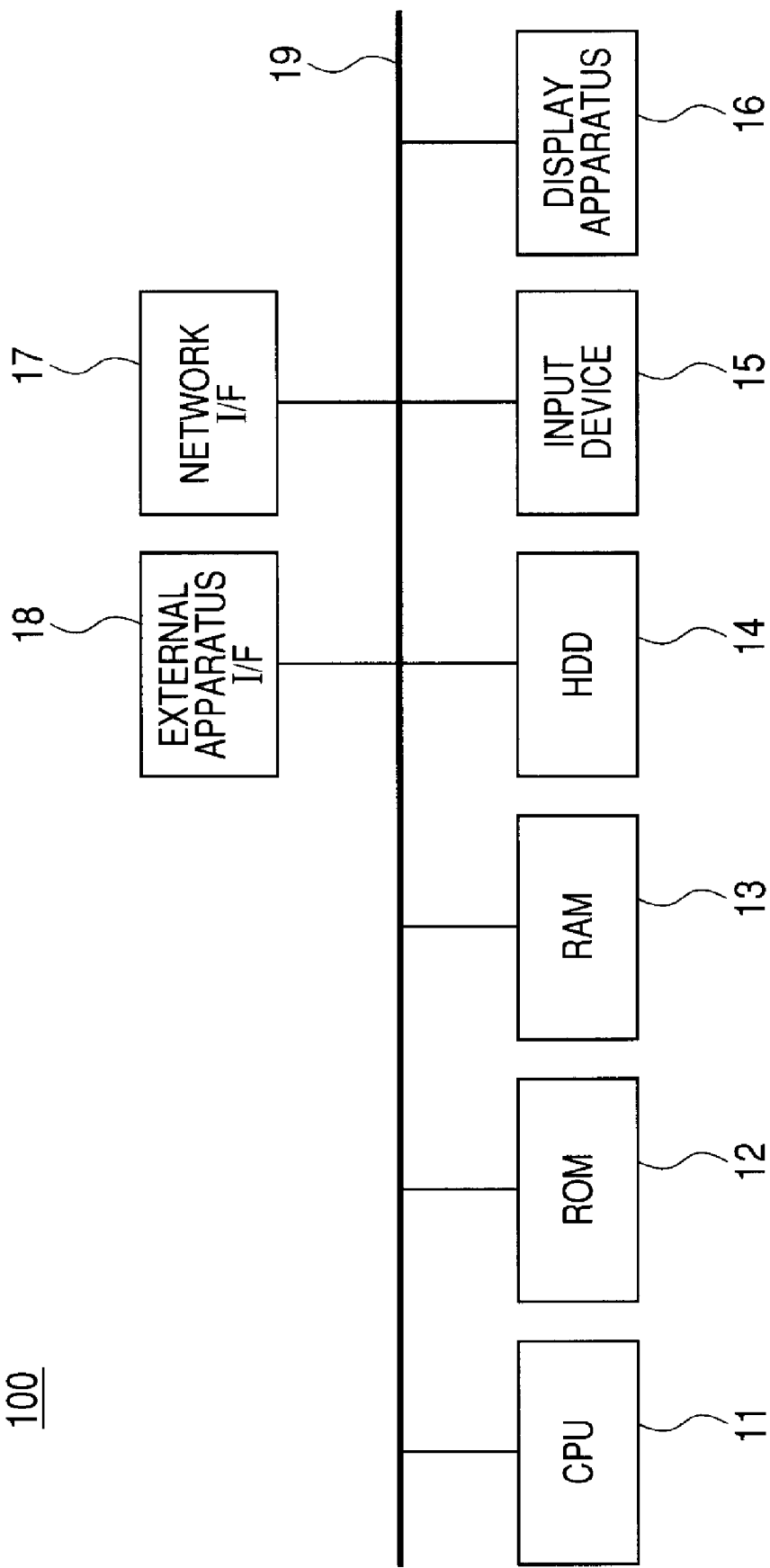
FIG. 1 is a diagram illustrating an example of a hardware construction of a host computer (information processing apparatus) 100.

FIG. 1 is a diagram illustrating an example of a hardware construction of a host computer (information processing apparatus) 100.

A CPU 11 executes each process of the apparatus. A ROM 12 stores a program and data regarding each process of the apparatus and is unrewritable. A RAM 13 can electrically store temporary data regarding each process of the apparatus and is rewritable. The host computer 100 stores a program and data regarding each process of the apparatus, the temporary data, application data, and the like into an HDD 14. An input device 15 is a keyboard or a pointing device which receives an instruction input to the apparatus. A display apparatus 16 displays an operating situation of the apparatus or information which is output by each program which operates on the apparatus. A network I/F 17 is connected to the LAN and Internet through a network and exchanges information to/from an outside. An external storage device or the like is connected to an external apparatus I/F 18. Those elements are coupled through a system bus 19 and transmit and receive the data.

The CPU 11 executes processes based on an operating system (OS), a printer driver or an application program stored in the HDD 14, so that functions (or processes) by the OS or printer driver, which will be described hereinafter, are realized.

Figure 2:
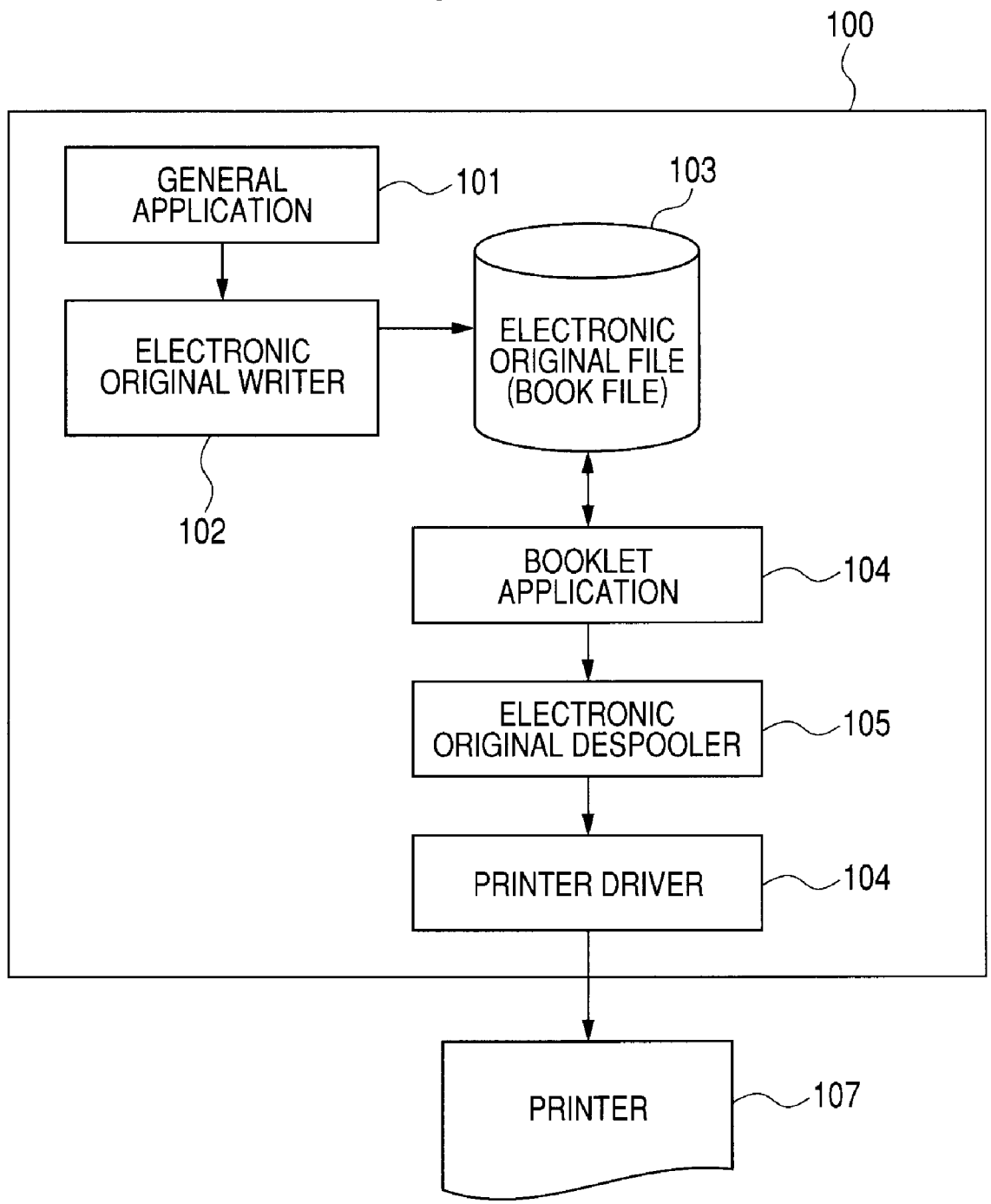
FIG. 2 is a diagram illustrating an example of a functional construction of the host computer 100.

FIG. 2 is a diagram illustrating an example of a functional construction of the host computer 100.

In a document processing system of the embodiment, a data file formed by a general application is converted into an electronic original file by an electronic original writer. A booklet application provides a function for editing the electronic original file. In the embodiment, a general application 101, an electronic original writer 102, a booklet application 104, and an electronic original despooler 105 are separately illustrated so as to clarify their functions. However, packages which are provided for the user are not limited to them. In other words, the packages may be provided as an application or graphics engine obtained by combining them.

The general application 101 is an application which provides a function such as word processing, spreadsheet, photo-retouch, draw or paint, presentation, text edition, or the like and has a printing function for the OS. When application data such as formed document data, image data, or the like is printed, those general applications 101 use a predetermined interface which is provided by the OS. That is, in order to print the formed data, the general application 101 transmits a predetermined output command (called a GDI function) of a format which depends on the OS to an output module of the OS which provides the interface. The output module which received the output command converts the command into a format which can be processed by an output device such as a printer or the like and outputs the converted command (called a DDI (Device Driver Interface) function). The format which can be processed by the output device differs depending on a kind, a manufacturer, a model type, or the like of the device. Therefore, a device driver is provided every device. The OS converts the command by using the device driver, produces print data, and summarizes them by a JL (Job Language), so that a print job is formed. In the case of using "Windows" (registered trademark) as an OS, a module called a GDI (Graphic Device Interface) corresponds to the foregoing output module.

The electronic original writer 102 is a driver obtained by improving the foregoing device driver and is a software module which is provided in order to realize the document processing system. However, the electronic original writer 102 does not aim at a specific output device but converts the output command into a format which can be processed by the booklet application 104 or a printer driver 106, which will be described hereinafter. The format after the conversion by the electronic original writer 102 (hereinbelow, called an electronic original format) is not particularly limited so long as it can express an original document of a page unit by a detailed form. Among substantial standard formats, for example, a PDF format, an SVG format, or the like can be used as an electronic original format.

In the case of allowing the general application 101 to use the electronic original writer 102, after the electronic original writer 102 is designated as a device driver which is used to output, the writer is allowed to execute the printing. However, an initial electronic original file formed by the electronic original writer 102 does not have a format as an electronic original file. Therefore, a device which designates the electronic original writer 102 as a device driver is the booklet application 104 and the conversion of application data into the electronic original file is executed under management of the booklet application 104. The booklet application 104 completes the new electronic original file formed by the electronic original writer 102 as an electronic original file having a format, which will be described hereinafter. If it is necessary to clearly distinguish the above point, the file formed by the electronic original writer 102 is called an electronic original file and the electronic original file to which the structure has been given by the booklet application is called a book file hereinbelow. If it is not necessary to distinguish in particular, any one of the document file, the electronic original file, and the book file which are formed by the applications is called a document file (or document data).

In this manner, the electronic original writer 102 is designated as a device driver and is allowed to print the data by the general application 101. Thus, the application data is converted into data in the electronic original format using the page defined by the general application 101 (hereinbelow, this page is referred to as a "logic page" or an "original page") as a unit and stored as an electronic original file 103 into a storage medium such as an HDD 14 or the like.

The booklet application 104 reads the electronic original file (or book file) 103 and provides a function for editing the file to the user. However, the booklet application 104 does not provide a function for editing the contents of each page but provides a function for editing a structure of a chapter or a book which is constructed by using the page as a minimum unit and will be described hereinafter.

When the electronic original file 103 edited by the booklet application 104 is printed, the electronic original despooler 105 is activated by the booklet application 104. The electronic original despooler 105 is a module which is installed in a computer together with the booklet application. The electronic original despooler 105 is also a module which is used to output draw data to the printer driver 106 when a document (book file) which is used in the booklet application 104 is printed. The electronic original despooler 105 reads out the designated book file from the HDD 14, forms an output command adapted to the output module of the OS mentioned above in order to print each page in the format described in the book file, and outputs to the output module (not shown). At this time, the printer driver 106 of a printer 107 which is used as an output device is designated as a device driver. The output module converts the output command received by using the designated printer driver 106 of the printer 107 into a device command which can be interpreted and executed by the printer 107. The device command is transmitted to the printer 107 and an image corresponding to the command is printed by the printer 107.

Figure 3:
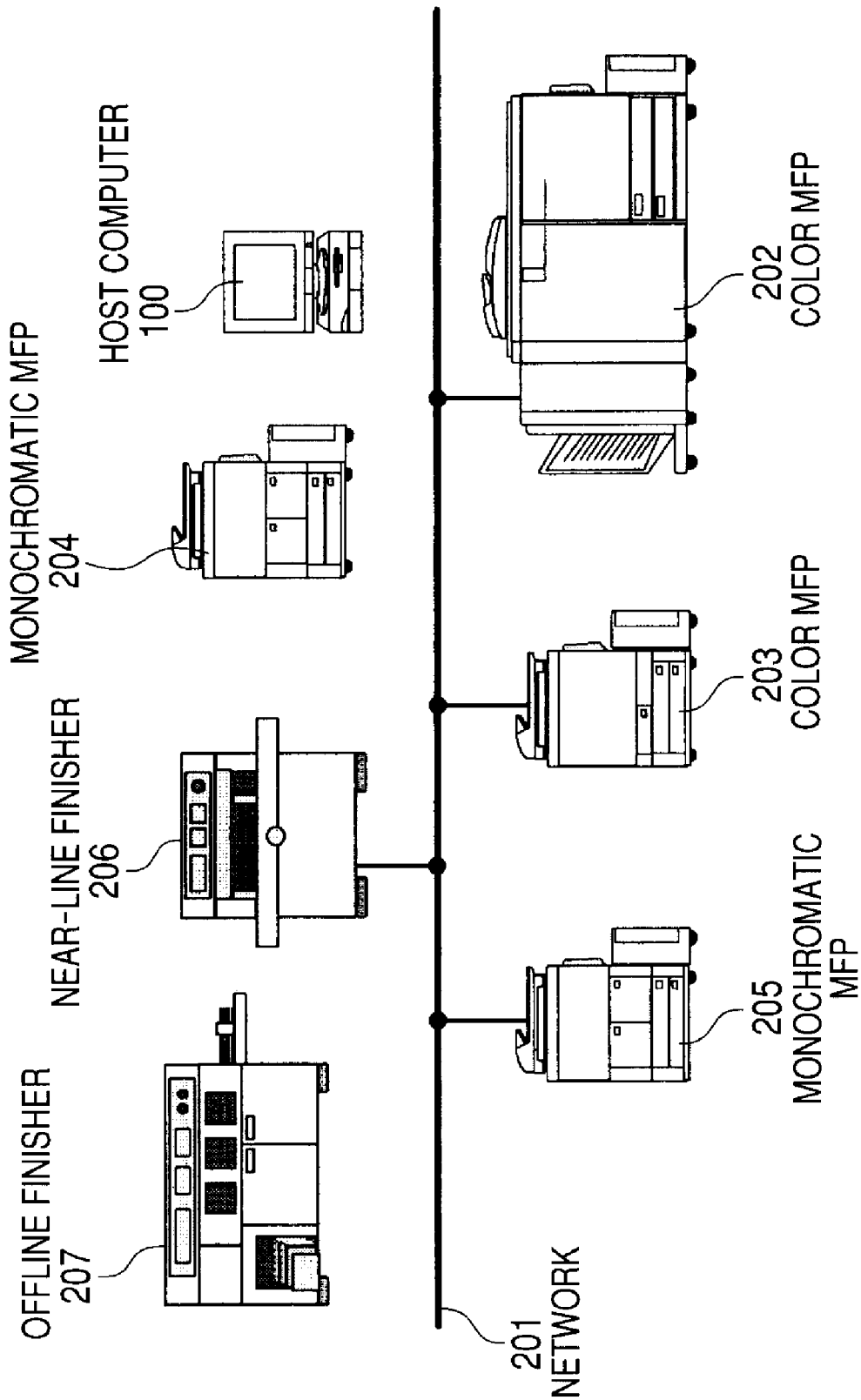
FIG. 3 is a diagram illustrating an example of a system construction of a document processing system.

FIG. 3 is a diagram illustrating an example of a system construction of the document processing system.

In FIG. 3, the host computer 100 is connected to color MFPs 202 and 203 and monochromatic MFPs 204 and 205 through a network 201. The host computer 100 is further connected to a near-line finisher 206. The user can also perform a finishing process by using an offline finisher 207 which is not connected to the network.

An inline finisher denotes a post-processing apparatus in which a paper path is physically connected to the MFP and a communicating unit of an operating instruction and a situation confirmation are also electrically connected to the MFP.

The near-line finisher denotes a post-processing apparatus in which the paper path is not connected to the MFP and, although the user (operator) conveys an output matter and makes a setup of the output matter, information about the operating instruction and the situation confirmation can be electrically transmitted and received through the communicating unit such as a network or the like.

The offline finisher denotes a post-processing apparatus in which the paper path and the communicating unit of the operating instruction, the situation confirmation, and the like are not connected to the MFP and the operator conveys the output matter, makes a setup of the output matter, manually executes an operation input, and confirms by the eyes a situation report which is issued by the apparatus itself.

In FIG. 3, the near-line finisher 206 and the offline finisher 207 are illustrated as apparatuses only for use of a post-process. However, actually, a form in which the finishers connected to the color MFPs 202 and 203 or the monochromatic MFPs 204 and 205 are used as virtual near-line finishers can be also used.

A construction in which a plurality of color MFPs and a plurality of monochromatic MFPs are included is illustrated in FIG. 3. However, it is sufficient that at least one color or monochromatic MFP for printing and the near-line finisher (including a virtual near-line finisher by the finisher of the MFP) or the offline finisher exist.

Prior to mentioning the details of the booklet application 104, a data format of the book file will be described. The book file has a layer structure of three layers which simulates a book as a paper medium. An upper layer is called "book" and simulates one book and attributes regarding the whole book are defined. An intermediate layer under the upper layer corresponds to a chapter in the book and is also similarly called "chapter". With respect to each chapter, attributes of each chapter can be also defined. A lower layer is called "page" and corresponds to each page defined by the application program. With respect to each page, attributes of each page can be also defined. One book may include a plurality of chapters and one chapter can include a plurality of pages.

Figure 4:
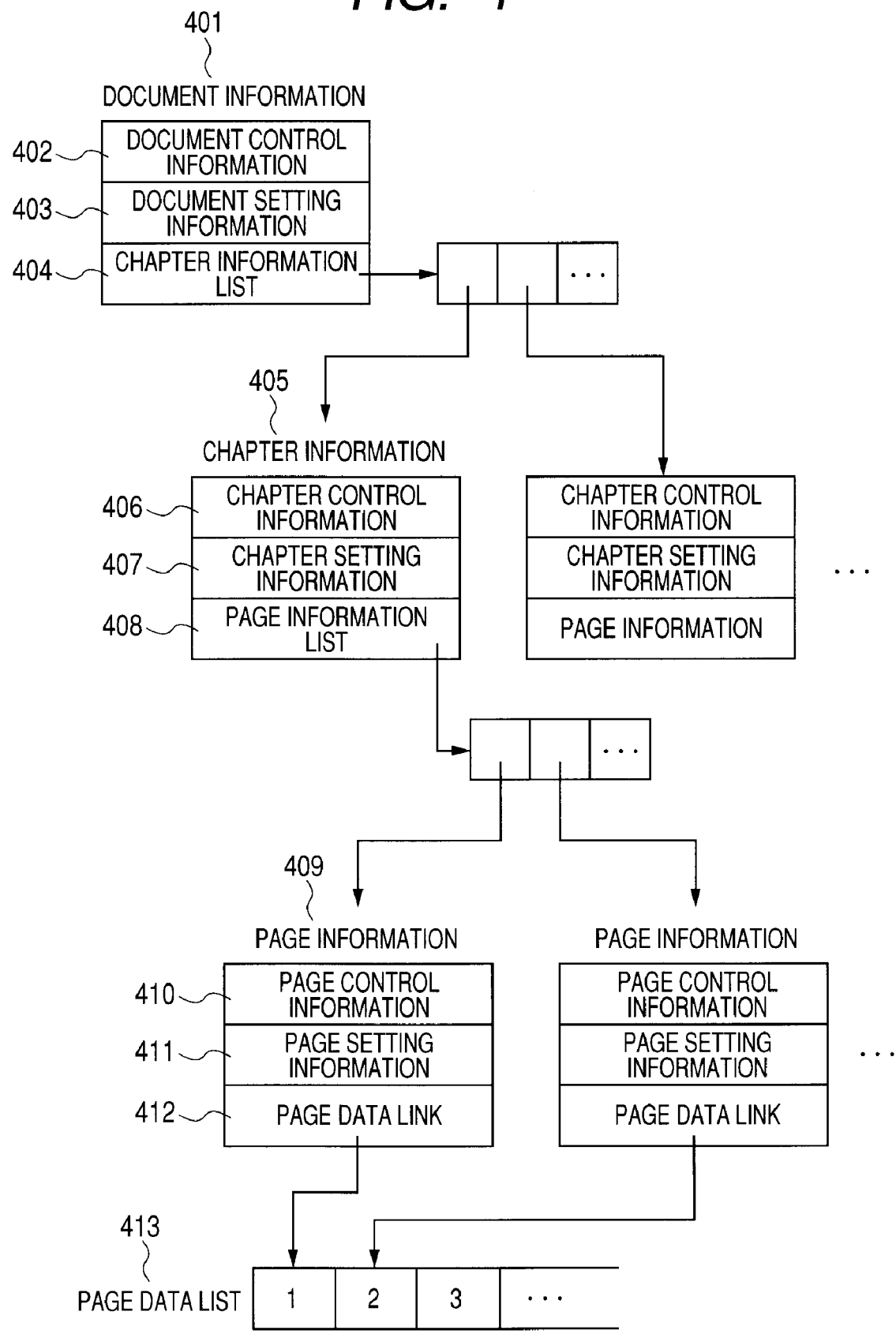
FIG. 4 is a diagram schematically illustrating an example of a format of a book file.

FIG. 4 is a diagram schematically illustrating an example of a format of a book file. A book, a chapter, and a page in the book file of this example are shown by corresponding nodes. One book file includes one book. Since the book and chapter are a concept for defining a structure as a book, the defined attribute values and a link to the lower layer are included as its substance. The page has data, as a substance, of each page which was output by the application program. Therefore, the page includes the substance of the original page (original page data) and the link to each original page data in addition to the attribute values. There is a case where a print page at the time when it is output to the paper medium or the like includes a plurality of original pages. With respect to such a structure, it is not displayed by the link but is displayed as attributes in each layer of the book, chapter, and page.

In FIG. 4, since it is not always necessary that the book file is one completed book, "book" is generalized as "document" and disclosed.

First, document information 401 is provided at the top. The document information 401 can be mainly classified into three parts 402 to 404. Document control information 402 holds information such as a path name and the like in a file system of a document file. Document setting information 403 holds layout information such as a page layout and the like and function setting information of the printing apparatus such as a staple or the like and corresponds to the attributes of the book. Chapter information list 404 holds a set of chapters constructing the document in a list format. Chapter information 405 is held by the list.

The chapter information 405 can be also mainly classified into three parts 406 to 408. Chapter control information 406 holds information such as a name of the chapter and the like. Chapter setting information 407 holds information such as page layout and staple which are peculiar to the chapter and corresponds to the attributes of the chapter. Since the setting information is held every chapter, a document having such a complicated layout that the first chapter has a 2-up layout and other chapters have a 4-up layout can be formed. A page information list 408 holds a set of original pages constructing each chapter in a list format. Page information 409 is instructed by the page information list 408.

The page information 409 can be also mainly classified into three parts 410 to 412. Page control information 410 holds information such as page number and the like which are displayed on a tree. Page setting information 411 holds information such as page rotational angle, page layout position, and the like and corresponds to the attributes of the original page. The page data link 412 is original data corresponding to the page. In this example, a construction in which the page information 409 does not directly have the original data but has only the page data link 412 and the actual original data is held by a page data list 413 is used.

FIG. 5 is a diagram illustrating an example of a list of book attributes (document setting information 403). Ordinarily, with respect to items which can be defined so as to overlap the lower layer, the attribute values of the lower layer are preferentially used. Therefore, with respect to items included only in the book attributes, the values defined in the book attributes are valid values through the whole book. However, with respect to items which overlap the lower layer, they have meanings as predetermined values in the case where they are not defined in the lower layer. However, in the embodiment, whether or not the attribute values of the lower layer are preferentially used can be selected as will be described hereinafter. Each item illustrated in the diagram does not specifically correspond to one item but there is also a case where a plurality of related items are included. As items peculiar to the book attributes, there are six items such as printing method, booklet details, cover/back cover, index paper, insert sheet, and chapter punctuation. They are the items which are defined through the book. As printing method attributes, three values of a simplex printing, a duplex printing, and a booklet printing can be designated. The booklet printing is a method whereby sheets of the number which is separately designated are collected as a bundle and folded in two and such bundles are bound together, thereby printing in a format in which the booklet can be performed. As booklet details attributes, when the booklet printing is designated, a center-spread direction, the number of bundles, and the like can be designated.

A cover/back cover attribute includes: a designation of addition of sheets serving as a cover and a back cover when the electronic original file which is bound as a book is printed; and a designation of contents which are printed to the added sheets. An index paper attribute includes: a designation of insertion of the index paper with a tab, as a punctuation of the chapter, which is separately prepared for the printing apparatus; and a designation of contents which are printed to the index (tab) portion. This attribute is validated in the case where an inserter having an inserting function for inserting the sheet which is separately prepared different from the print paper to a desired position is equipped for the printing apparatus which is used or the case where a plurality of sheet feeding cassettes can be used. This is true of an insert sheet attribute.

The insert sheet attribute includes: a designation of insertion of the sheet which is supplied as a punctuation of the chapter from the inserter or a feeding cassette; a designation of a sheet feeding source in the case of inserting the insert sheet; and the like.

A chapter punctuation attribute includes a designation about whether or not a new sheet is used, a new print page is used, nothing is executed in particular, or the like at a punctuation of the chapter. In a simplex printing mode, use of the new sheet and use of the new print page have the same meaning. In a duplex printing mode, if "use of the new sheet" is designated, a continuous chapter is not printed onto one sheet. However, if "use of the new print page" is designated, there is a possibility that the continuous chapter is printed onto the obverse and reverse surfaces of one sheet.

FIG. 6 is a diagram illustrating an example of a list of the chapter attributes (chapter setting information 407). FIG. 7 is a diagram illustrating an example of the page attributes (page setting information 411). A relation between the chapter attributes and the page attributes is also similar to a relation between the book attributes and the attributes of the lower layer.

With respect to the chapter attributes, there are no items which are peculiar to the chapter and all of the chapter attributes overlap the book attributes. Therefore, generally, if the definitions in the chapter attributes and the definitions in the book attributes differ, the values defined in the chapter attributes are preferentially used. However, in the embodiment, whether or not the attribute values of the lower layer are preferentially used can be selected as will be described hereinafter.

As items which are common only to the book attributes and the chapter attributes, there are five items such as sheet size, sheet direction, N-up printing designation, enlargement/reduction, and discharging method. Among them, an N-up printing designation attribute is an item for designating the number of original pages included in one print page. As a layout which can be designated, there are layouts such as 1×1, 1×2, 2×2, 3×3, 4×4, and the like. A discharging method attribute is an item for designating whether or not a stapling process is executed to the ejected paper. Validity of the attributes depends on whether or not the printing apparatus which is used has a stapling function.

As items which are peculiar to the page attributes, there are items such as page rotation attribute, zoom, layout designation, annotation, page division, and the like. The page rotation attribute is an item for designating a rotational angle at the time when the original page is arranged to the print page. A zoom attribute is an item for designating a zoom ratio of the original page. The zoom ratio is designated by assuming that a size of virtual logical page region is equal to 100%. The virtual logical page region is a region which is occupied by one original page in the case where the original page is arranged according to the designation of N-up or the like. For example, when the layout is assumed to be 1×1, the virtual logical page region is a region corresponding to one print page. In the case of the layout of 1×2, the virtual logical page region is a region where each side of one print page has been reduced to about 70%.

As attributes common to the book, chapter, and page, there are a watermark attribute and a header/footer attribute. The watermark is an image, a character string, or the like which is printed so as to be overlaid to the data formed by the application and is separately designated. The header/footer are watermarks which are printed in an upper blank and a lower blank of each page. As for the header/footer, items such as page number, time/date, and the like which can be designated by variables are prepared. Although the contents which can be designated in the watermark attribute and the header/footer attribute are common to those of the chapter and page, the contents of the book differ from those of the chapter and page. In the book, the contents of the watermark and the header/footer can be set. In the book, how to print the watermark and the header/footer can be designated for the whole book. In the chapter and the page, whether or not the watermark and the header/footer set in the book are printed in the chapter and the page can be designated.

The book file has the structure and contents as mentioned above. Subsequently, a process for forming the book file by the booklet application 104 and the electronic original writer 102 will be described. The formation of the book file is realized as a part of the editing operation of the book file by the booklet application 104.

FIG. 8 is a flowchart illustrating an example of processes at the time when the book file is opened by the booklet application 104.

First, whether the book file to be opened is a file which should be newly formed or the existing file is discriminated (step S701). In the case of newly forming the book file, the book file which does not include any chapter is newly formed (step S702). As shown in the example of FIG. 4, the book file which is newly formed has only a book node 301 and becomes a node of the book in which a link to the node of the chapter does not exist. As for the book attributes, a set of attributes prepared for new formation is applied. A user interface (UI) display screen to edit the new book file is displayed (step S704).

Figure 9:
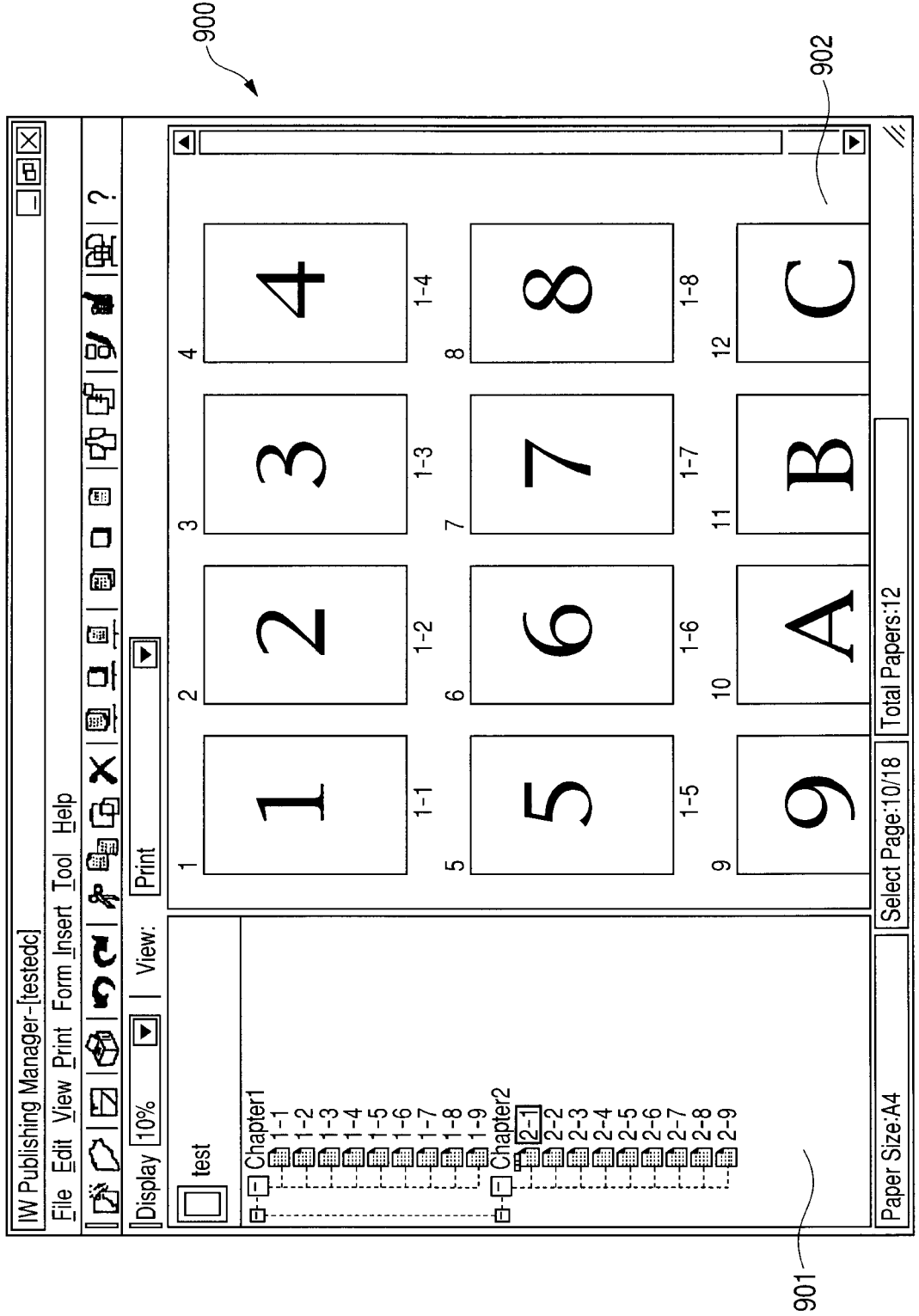
FIG. 9 is a diagram illustrating an example of a UI display screen of the booklet application 104.

FIG. 9 is a diagram illustrating an example of the UI display screen of the booklet application 104. A UI display screen 900 includes: a tree portion 901 illustrating a structure of the book; and a preview portion 902 for displaying a printed state. A document is constructed by a set of chapters and each chapter is constructed by a set of original pages. The chapters included in the book and the pages included in each chapter are displayed in the tree portion 901 so that the tree structure as illustrated in FIG. 4 can be recognized. The pages which are displayed in the tree portion 901 are the original pages. The contents of the print page are reduced and displayed in the preview portion 902. The structure of the book is reflected to displaying order.

Application data converted into an electronic original file by the electronic original writer 102 can be added as a new chapter to the opened book file. Such a function is called an electronic original import function. By performing the electronic original import to the book file which was newly formed by the process in FIG. 8, a substance is given to the book file. Such a function is activated by drag-and-drop operating the application data to the display screen of FIG. 9.

Further, in addition to an edition such as exchange of page order of the document, copy, deletion, or the like, the booklet application 104 can also set a function such as a staple or the like of the printing apparatus and can print by the designated printing apparatus.

The book file can be formed from the application data as mentioned above. With respect to the formed book file, the following editing operations can be executed to the chapter and page.

(1) New addition
(2) Deletion
(3) Copy
(4) Cut
(5) Paste
(6) Movement
(7) Change of chapter name
(8) Rearrangement of page numbers and names
(9) Insertion of cover
(10) Insertion of insert sheet
(11) Insertion of index paper
(12) Page layout to each original page Besides, the operation for cancelling the editing operation which has once been executed and the operation for executing the cancelled operation again can be further executed. By those editing functions, for example, the editing operations such as integration of a plurality of book files, rearrangement of chapters and pages in the book file, deletion of chapters and pages in the book file, change in layout of the original page, insertion of the insert sheet or index paper, and the like can be executed. By executing those operations, an operation result is reflected to attributes illustrated in FIGS. 5 to 7 or is reflected to the structure of the book file. For example, if the operation for newly adding a blank page is executed, the blank page is inserted to a designated position. The blank page is treated as an original page. If the layout for the original page is changed, its change contents are reflected to attributes such as printing method, N-up printing, cover/back cover, index paper, insert sheet, and chapter punctuation.

Examples of the display and operation at the time of editing in the embodiment will be described in detail hereinafter.

A final object of the book file which is formed and edited as mentioned above is to print and output. When the user selects a file view from the UI display screen 900 of the booklet application illustrated in FIG. 9 and selects "print" from there, the print output is performed by a designated output device. In this instance, first, the booklet application 104 forms a job ticket from the book file which is opened at present and sends it to the electronic original despooler 105. The electronic original despooler 105 converts the job ticket into an output command of the OS, for example, a GDI command of Windows and transmits it to an output module, for example, a GDI. The output module forms a command suitable for the device by the designated printer driver 106 and transmits to the device.

That is, a graphics engine of the output module (not shown) loads the printer driver 106 prepared every printing apparatus into the RAM 13 from an external memory or the like and sets an output device to the printer driver 106. The output module converts the received GDI function into a DDI function and outputs the DDI function to the printer driver 106. Based on the DDI function received from the output module, the printer driver 106 converts into a control command, for example, a PDL (Page Description Language) which can be recognized by the printer. The converted printer control command passes through a system spooler loaded into the RAM 13 by the OS and is output as print data to the printer 107 through an interface 21.

The job ticket is data having a structure in which the original page is set to the minimum unit. As for the structure in the job ticket, a layout of the original pages on the sheet is defined. One job ticket is issued per job. Therefore, first, a node such as a document exists at the highest position and attributes of the whole document, for example, duplex printing/simplex printing and the like are defined. Sheet nodes belong to a position under the highest position. An identifier of the sheet to be used and attributes such as a designation of a sheet feeding port in the printer and the like are included. A node of the sheet which is printed onto the sheet belongs to each sheet node. One sheet corresponds to one sheet of paper. A print page (physical page) belongs to each sheet. In the simplex printing, one physical page belongs to one sheet. In the duplex printing, two physical pages belong to one sheet. The original page which is arranged onto each physical page belongs to each physical page. The layout of the original pages is included as an attribute of the physical page.

Figure 10:
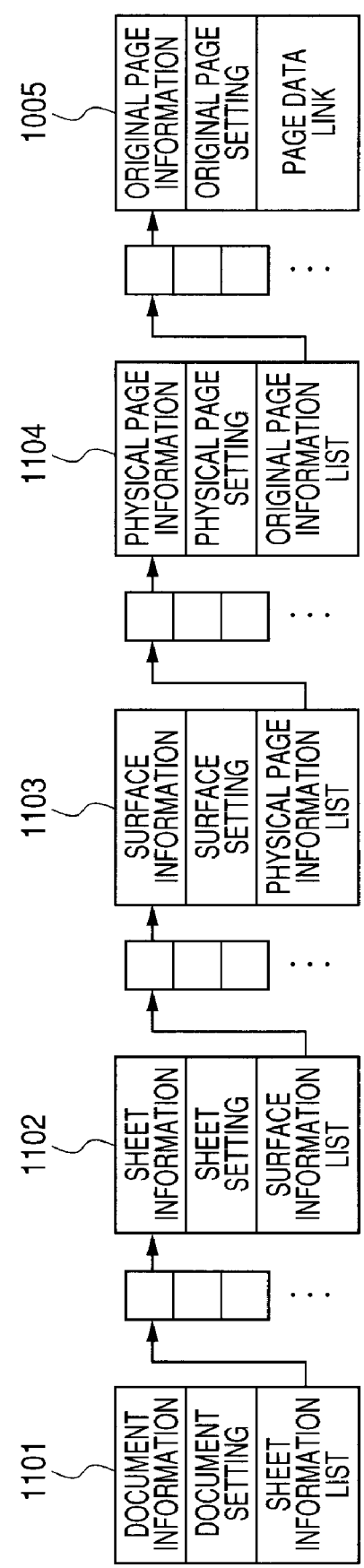
FIG. 10 is a diagram illustrating an example of a data structure of a job ticket.

An example of the data structure of the job ticket is illustrated in FIG. 10. FIG. 10 is a diagram illustrating the example of the data structure of the job ticket. In the data for printing, the document is constructed by a set of sheets. Each sheet is constructed by two surfaces of an obverse surface and a reverse surface. Each surface has a region (physical page) where the originals are arranged. Each physical page is constructed by a set of original pages each corresponding to the minimum unit. Data 1101 corresponding to the document is constructed by: data regarding the whole document; and a list of sheet information constructing the document. Sheet information 1102 is constructed by: information of regarding the sheet such as a sheet size and the like; and a list of surface information of the surfaces which are arranged onto the sheet. Surface information 1103 is constructed by: data that is peculiar to the surface; and a list of physical pages which are arranged onto the surface. Physical page information 1104 is constructed by: information such as size of physical page, header/footer, and the like; and a list of original pages constructing the physical page.

The electronic original despooler 105 converts the foregoing job ticket into an output command which is sent to the output module.

Although the document processing system of the embodiment is a stand-alone type system as mentioned above, even in a server client system obtained by expanding such a system, a book file can be formed and edited by a construction and a procedure which are almost similar to those of the stand-alone type system. However, the book file and the printing process are managed by a server.

Figure 11:
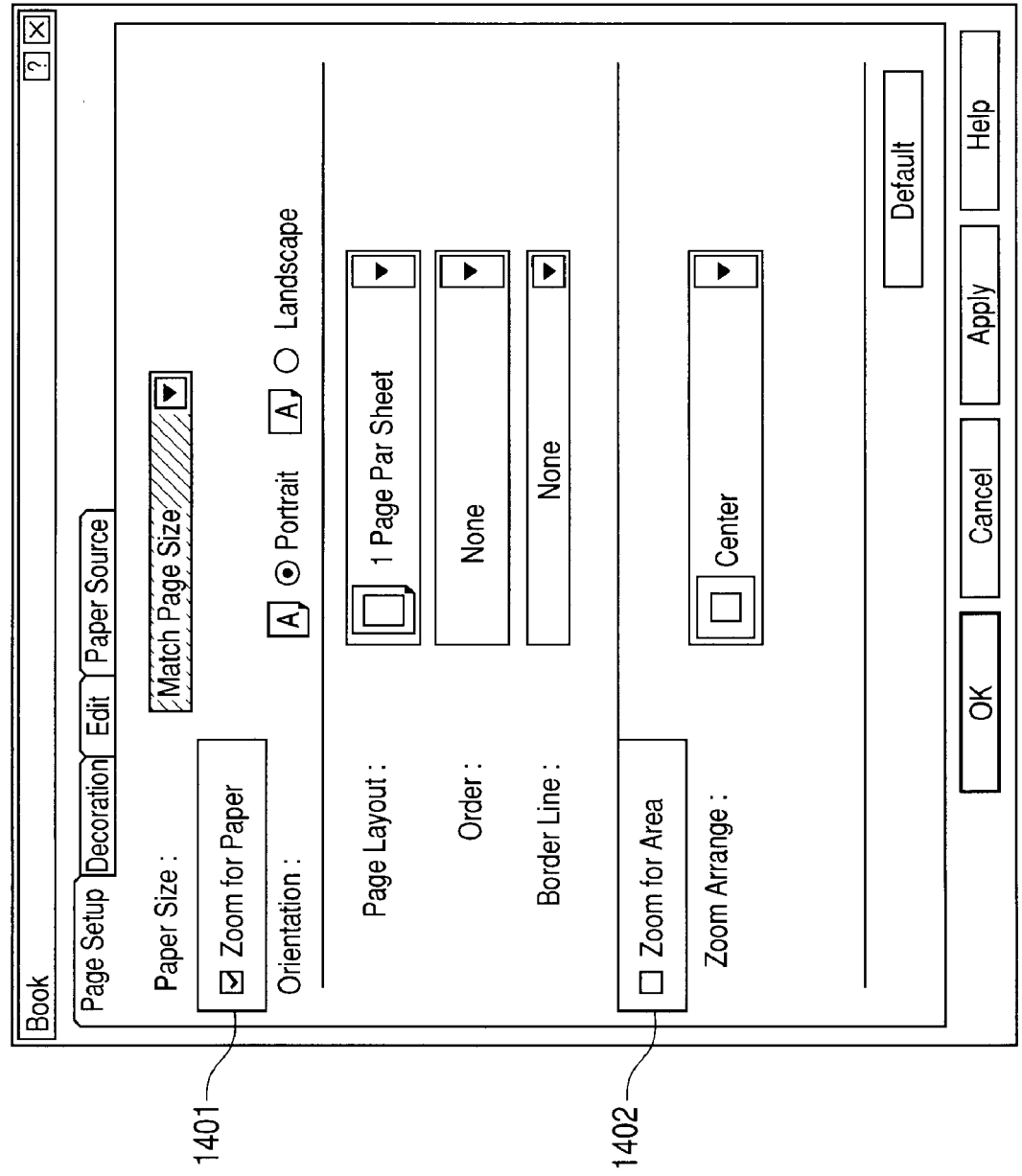
FIG. 11 is a diagram illustrating an example of a "detailed setting of document" window 1400 of the booklet application 104.

FIG. 11 is a diagram illustrating an example of a "detailed setting of document" window 1400 of the booklet application 104.

In this window, the user can display/set the "document setting information 403". The window is activated from the application operating display screen of FIG. 9. The "detailed setting of document" window is a window for setting the attributes which exert an influence on the whole document. The window is constructed by four sheets of Page Setup, Decoration, Edit, and Paper Source. FIG. 11 illustrates a state where the Page Setup sheet has been displayed. In the Page Setup sheet, the user can make a setup mainly regarding the layout and can instruct settings such as sheet size, orientation, N-page printing, and the like. The N-page printing denotes a printing process for arranging data of N pages onto the surface of the sheet. Check box controls 1401 and 1402 regarding the zoom are arranged in this window.

Although information of the check box controls set on the above setting display screen may be held in a dedicated area, it is desirable to hold the information as one of the attributes into the setting information illustrated in FIG. 4. In such a case, the area for holding the information of the check box controls is added to FIGS. 6 and 7.

Figure 12:
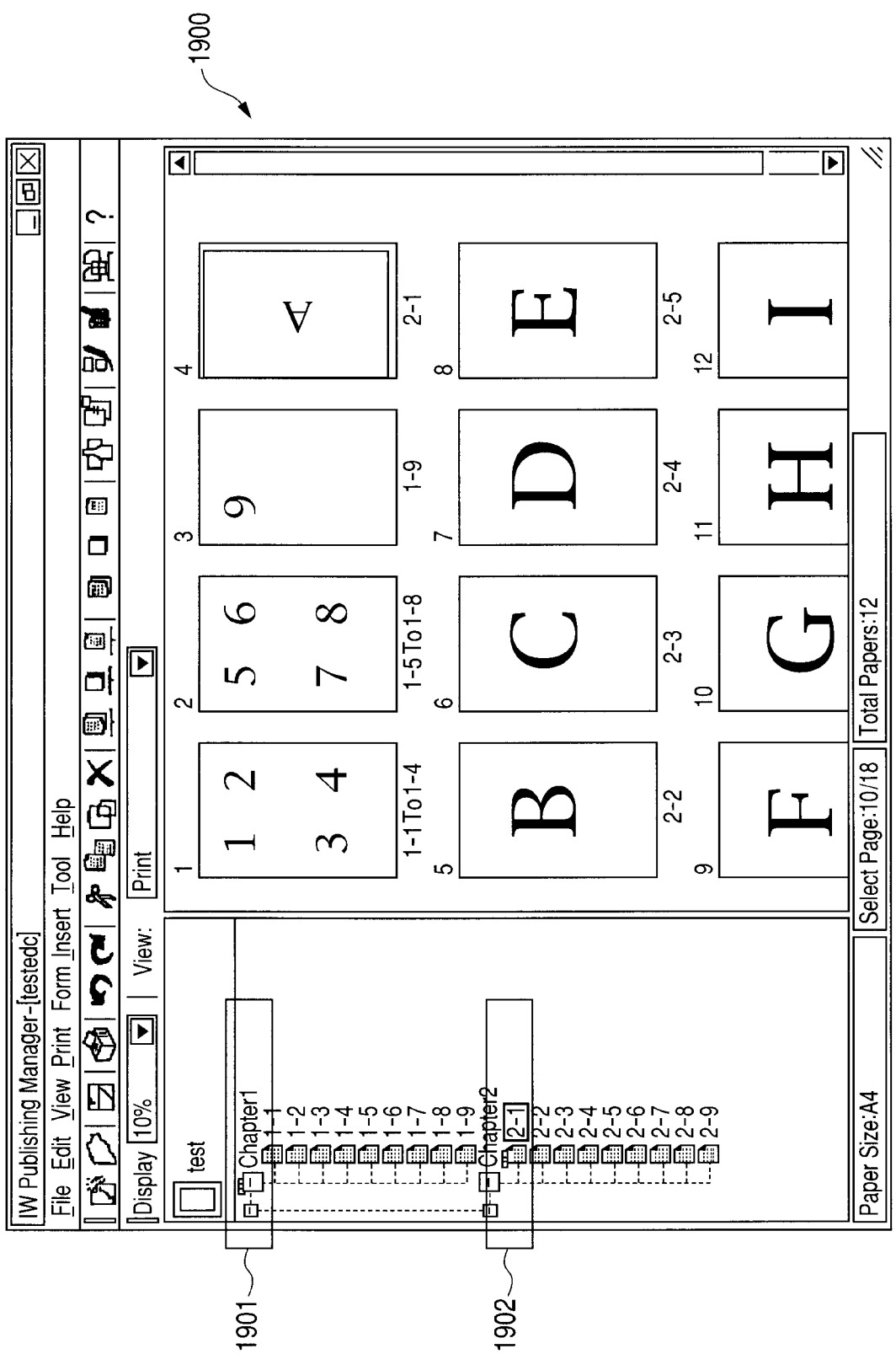
FIG. 12 is a diagram illustrating an example of a display format of an application in the case where setting values of an upper layer are not used with respect to setting items which overlap the upper layer.

A display format of an application in the case where setting values of an upper layer are not used with respect to setting items which overlap the items in the upper layer is illustrated in FIG. 12.

In the example of FIG. 12, the document is constructed by two chapters and each chapter has original data of nine pages. The diagram illustrates a display example in the case where a layout of the first chapter is set to 4UP (also expressed as 4in1) and a rotation is designated for the head page (the 10th page in the whole document) of the second chapter. In a preview on the right side, a state where four originals have respectively been arranged onto one page with respect to each of the first to third pages is displayed. A state where a character "A" as data of the fourth page has been rotated is displayed. A display format of a tree view in the case where the setting peculiar to the chapter or page has been made will be described. A state where an icon 1901 for the first chapter has been changed and the setting peculiar to this chapter has been made for this chapter is illustrated. A state where an icon 1902 for the first page of the second chapter has been changed and the special setting has been made for this page is illustrated.

Figure 13:
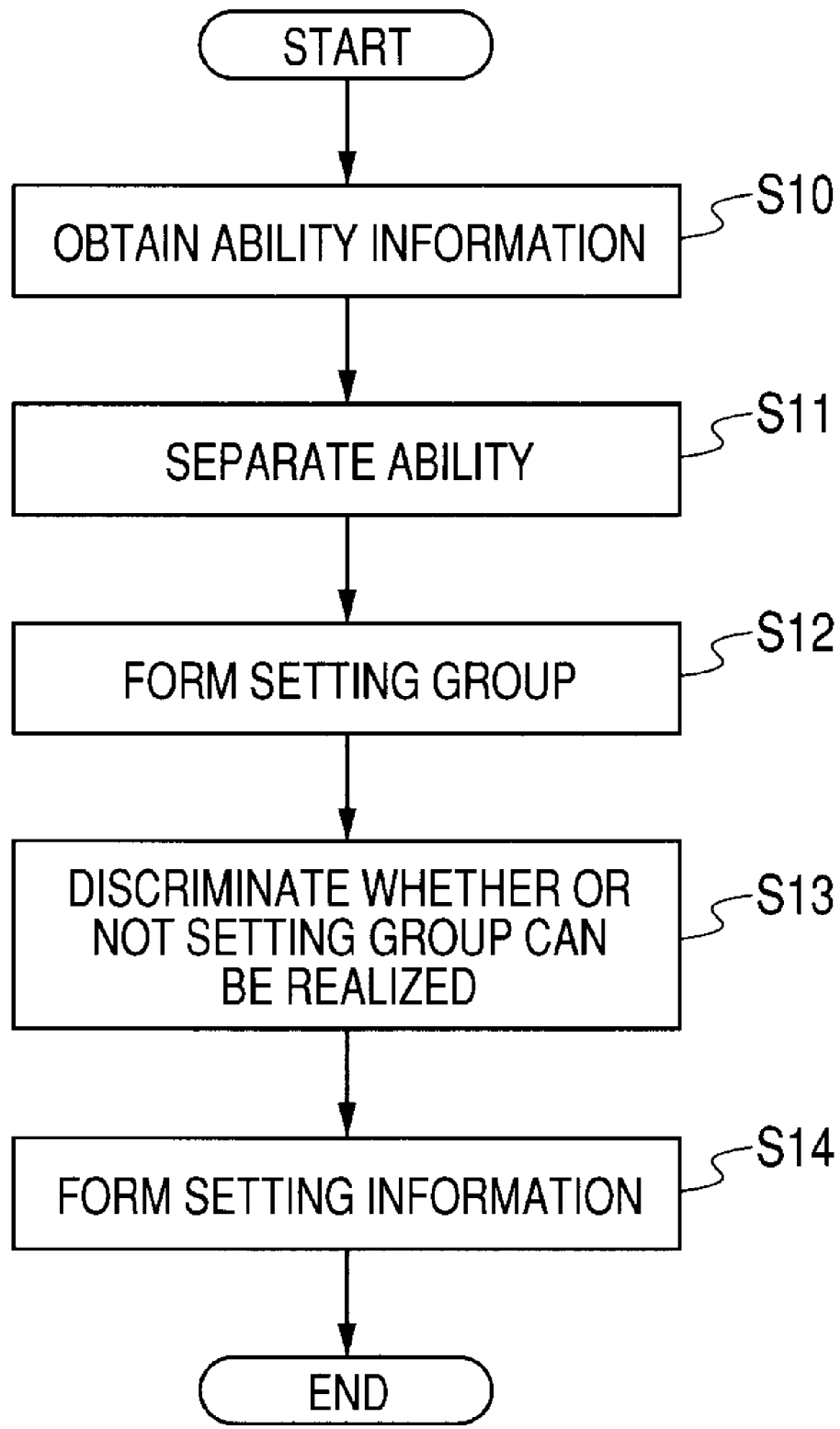
FIG. 13 is a flowchart illustrating a schematic example of processes in the case of executing processes of a document by using a printer (having a finisher) which is used for printing and a near-line finisher.

A schematic example in which a printed matter is formed by using a plurality of printers (having the finisher) in the document processing system is illustrated in a flowchart of FIG. 13.

In step S10, the host computer 100 obtains information (ability information) regarding an ability of the device from the device which can communicate through the network (obtainment of device ability information).

Figure 14:
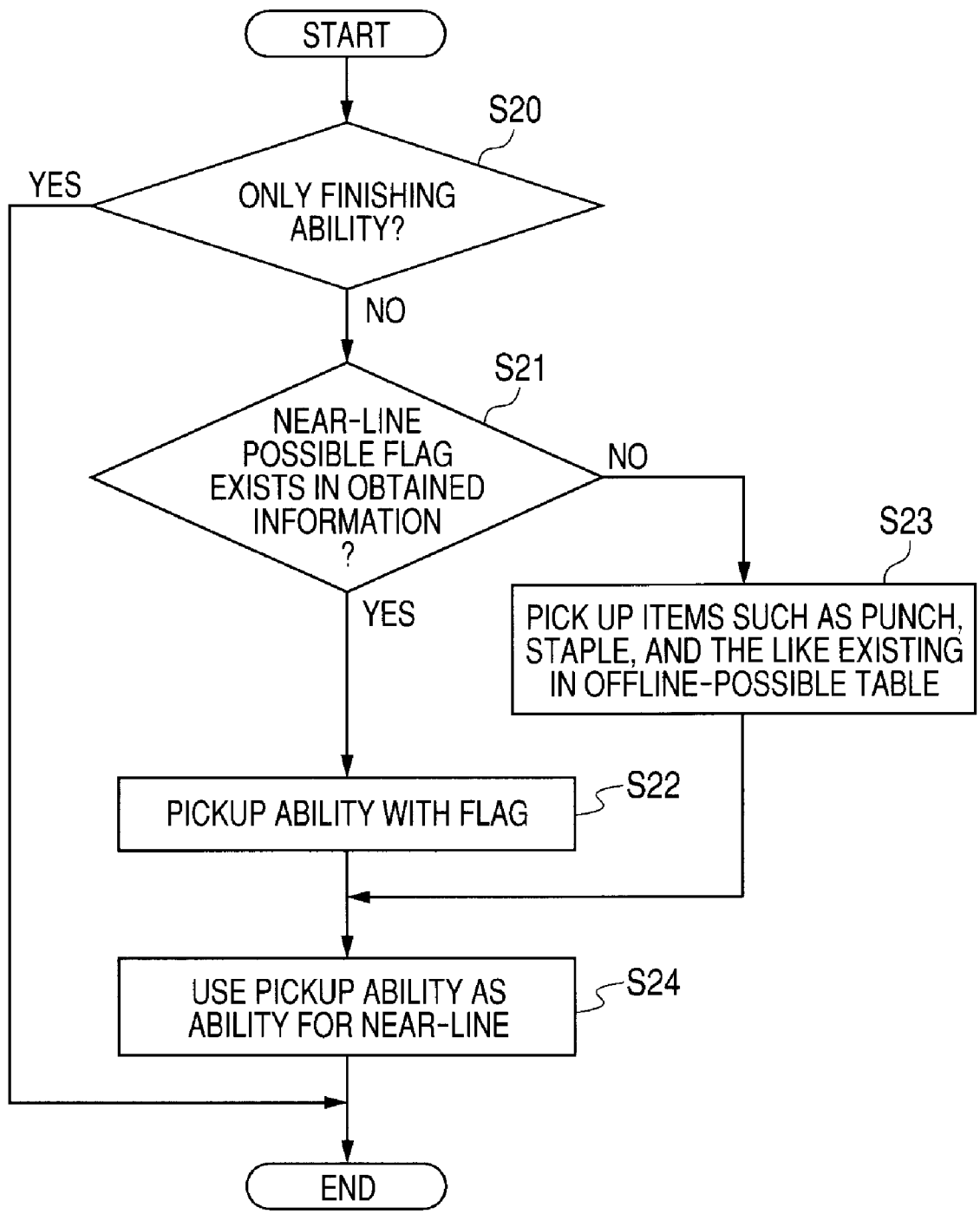
FIG. 14 is a flowchart illustrating an example of an ability separating process which is executed in step S11 in FIG. 13.

Subsequently, in step S11, the host computer 100 discriminates whether or not the device which is used is a virtual near-line finisher which can execute the printing and the finishing process. If the device which is used is the virtual near-line finisher which can execute the printing and the finishing process, the host computer 100 separates the ability which can be used as a near-line finisher from the ability of the whole printer. Details of the process of step S11 are illustrated in FIG. 14, which will be described hereinafter.

Figure 15:
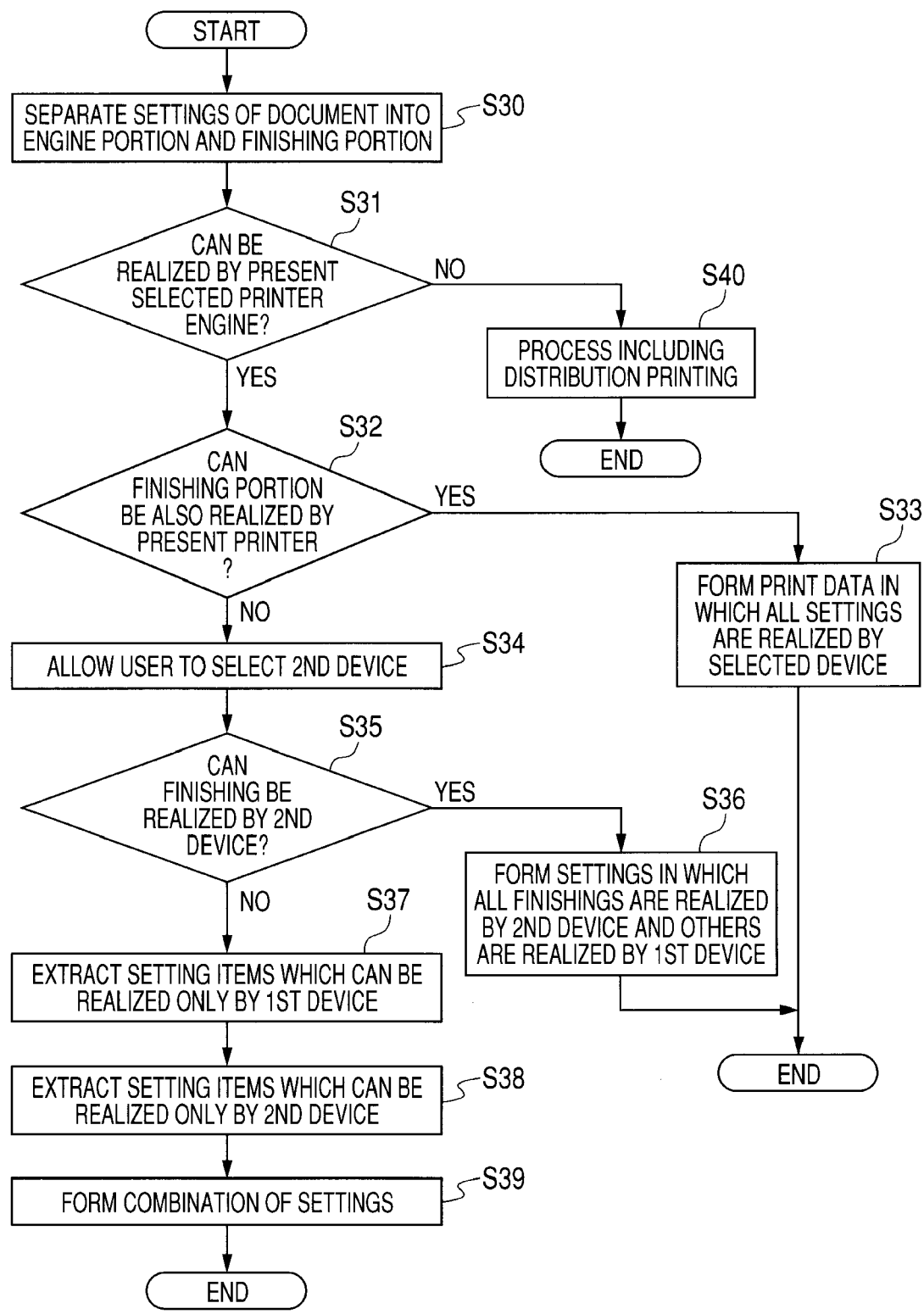
FIG. 15 is a flowchart illustrating an example of a process of step S12 in the flowchart of FIG. 13.

Subsequently, in step S12, the host computer 100 allocates the setting items designated by the user to a plurality of devices and groups the settings which are executed every device (divides into combinations). That is, the host computer 100 forms combination information which includes executing order and is related to the combination of the setting items and the device in such a manner that a series of processes regarding the print setting information including a plurality of setting items are executed by the plurality of devices (formation of combination information). Details of the process of step S12 are illustrated in FIG. 15, which will be described hereinafter.

Subsequently, in step S13, the host computer 100 discriminates whether or not the setting groups formed in step S12 can be realized while referring to the ability of each device obtained in steps S10 and S11. If the setting group (combination) which can be realized was found out, in step S14, the host computer 100 forms setting information which is necessary for the processes of each device by using the setting groups formed in step S12 (formation of setting information).

In FIG. 13, the host computer 100 executes the grouping process in step S12 and, thereafter, discriminates whether or not the setting groups can be realized in step S13. However, in the case of executing only the process for simply grouping, the number of combinations is very large. Therefore, a process for suppressing the formation of such combinations that it is predicted at a point of time of step S12 that they cannot be easily realized is considered.

FIG. 14 is a flowchart illustrating an example of step S11 in FIG. 13. In the case of the near-line finisher, only the finishing ability can be obtained. However, in the case of the virtual near-line finisher which can also execute the printing, ability information including the printing ability by the printer and the finishing ability is obtained. In this case, if only the information of the ability which can be used as a finisher is not derived from the obtained ability information, the correct device ability cannot be discriminated.

Therefore, in step S20, the host computer 100 discriminates whether or not the information (ability information) obtained from the device indicates only the finishing ability. If it is the information from the near-line finisher, the host computer 100 finishes the processes illustrated in FIG. 14 because it is only the finishing information.

If information other than the finishing was also obtained in step S20, the host computer 100 discriminates whether or not a flag to separate the finishing information and the other information exists in the obtained information in step S21. If the flag exists, the host computer 100 separates the finishing ability and the non-finishing ability based on the flag and step S24 follows (step S22).

In step S23, the host computer 100 separates the finishing ability from the obtained ability information by using information in a finishing ability table which has been prepared (that is, stored in the HDD 14 or the like). Such a classification that although the staple, punch, or the like is a finishing ability, an ability such as resolution or color/monochrome is not a finishing or the like is disclosed in the finishing ability table. The host computer 100 decides that information which is not disclosed in the table is not the finishing ability.

In step S24, the host computer 100 records the finishing information separated in step S22 or step S23 as an ability of the device.

FIG. 15 is a flowchart illustrating an example of the process of step S12 in the flowchart of FIG. 13. This flowchart relates to a processing example in the case where all finishings are preferentially executed by one device.

In step S30, the host computer 100 separates the settings designated by the user into the settings of the finishing and the other settings.

Subsequently, step S31 follows and based on the ability information and the like, the host computer 100 discriminates whether or not all non-finishing designations of the document can be realized by the printer of the output destination side (the first printing apparatus) designated by the user. In the discrimination about whether or not the settings can be realized by the selected printer, the discriminating method in the related art can be used.

In step S32, based on the ability information and the like, the host computer 100 further discriminates whether or not the settings in the finishing portion of the document can be realized by the selected printer (the first printing apparatus). As a discriminating method of step S32, the discriminating method in the related art can be also used. If the finishing settings of the document can be also realized, the host computer 100 advances to step S33 and forms print data in which all of the settings (print setting information and post-print processing information) of the present document are executed by the selected device, and finishes the processes illustrated in FIG. 15. If it is determined in S32 that the finishing settings of the document cannot be realized, the host computer 100 advances to step S34. Together with the foregoing setting information, drawing data which is printed is included in the print data.

In step S34, for example, the host computer 100 displays a screen to the display apparatus 16 or the like, allows the user to select the second device (the second printing apparatus), and obtains the finishing ability of the second device. Further, step S35 follows and based on the ability information and the like, the host computer 100 discriminates whether or not the second device selected in step S34 can execute all of the finishing designations of the document. If the host computer 100 decides that they can be executed, step S36 follows. If NO, step S37 follows. If the processing routine advances to step S37 and subsequent steps, it is necessary that the host computer 100 shares the finishing process by a plurality of devices and executes.

In step S36, the host computer 100 forms combination information of such settings that all of the finishings are executed by the second device (the second printing apparatus) and the other settings are executed by the first device (the first printing apparatus), and finishes the processes illustrated in FIG. 15. Thus, the print data in which the print setting information and the drawing data are included is transmitted to the first device and the print data in which the post-print processing information is included is transmitted to the second device.

In step S37, the host computer 100 extracts the setting items which can be executed only by the first device among the finishing settings of the document.

In step S38, the host computer 100 extracts the setting items which can be executed only by the second device among the finishing settings of the document.

In step S39, in order to realize the finishing settings by combining the first device and the second device, the host computer 100 divides the finishing settings of the document and decides the setting items which are executed by each device.

Figure 16:
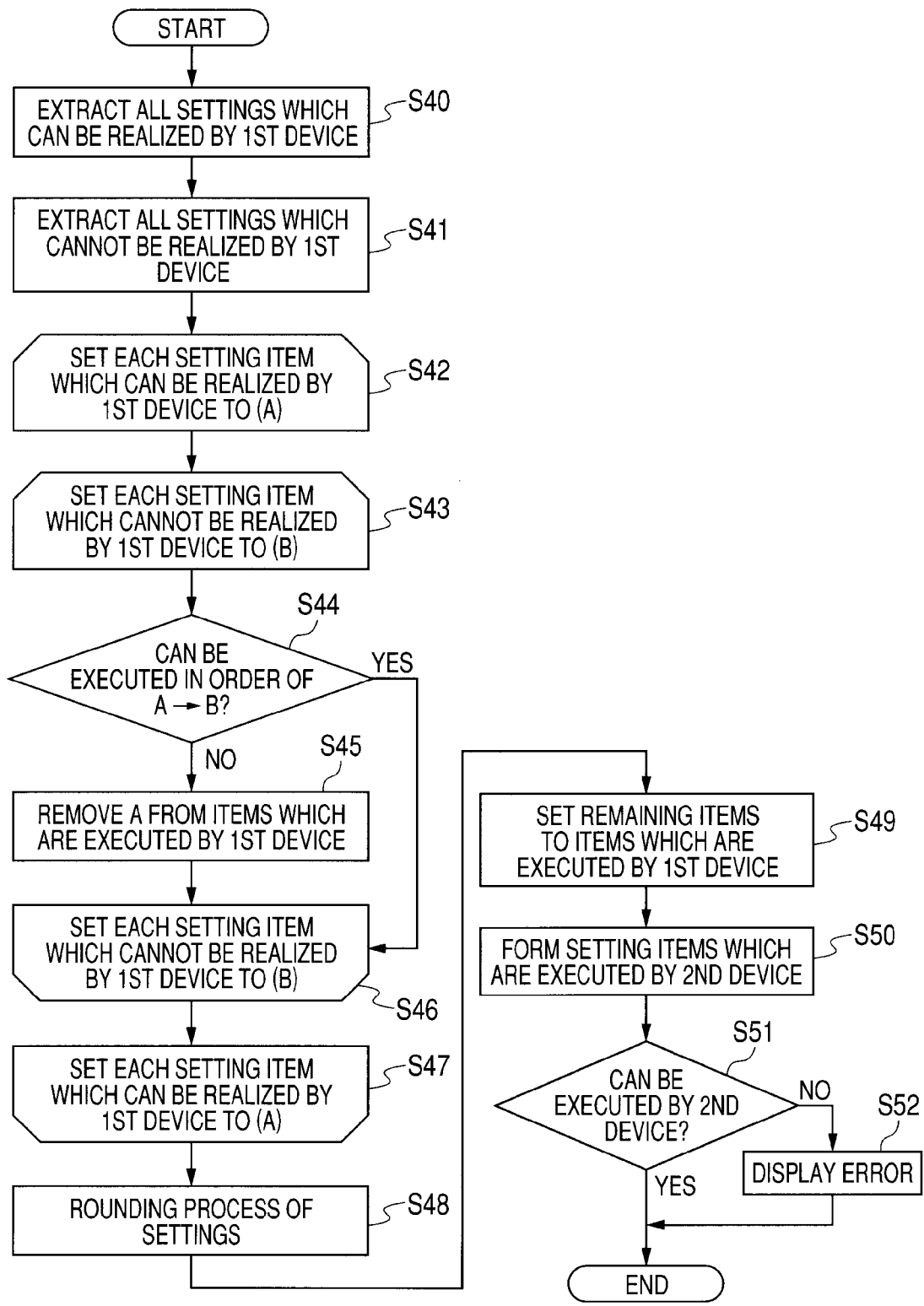
FIG. 16 is a flowchart for describing details of a process of step S39 in the flowchart of FIG. 15.
Figure 17:
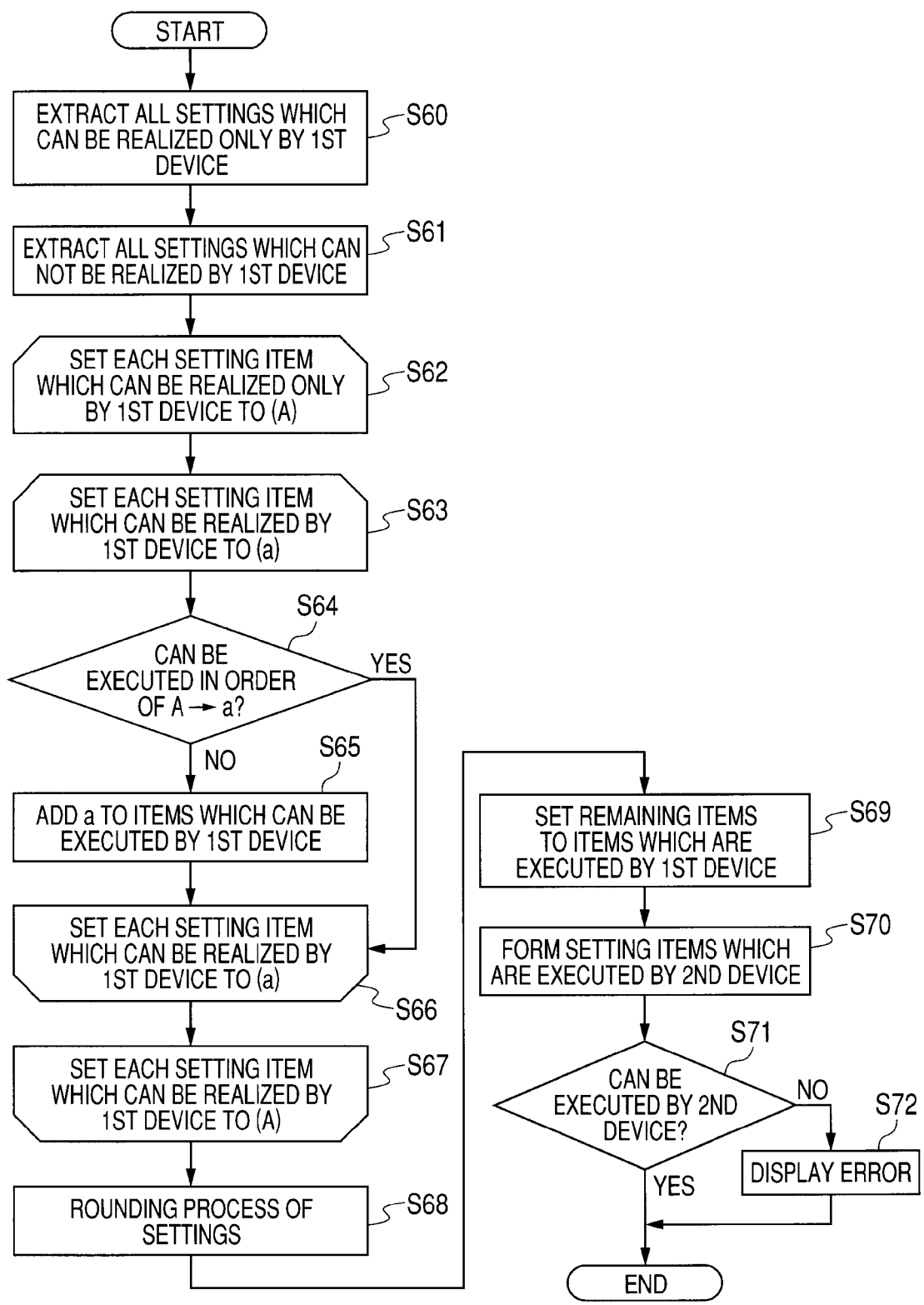
FIG. 17 is a flowchart for describing details of another example of a process of step S39 in the flowchart of FIG. 15.

Details of the process of step S39 are illustrated in FIGS. 16 and 17, which will be described hereinafter.

In the present flowchart, the host computer 100 allows the user to select the second device in step S34. This method has such an advantage that the user can designate a work flow which is formed by using which one of the devices. However, if the device different from the first device can be selected as a second device from a number of devices, the second device may be selected by another method. For example, a method whereby the information of the second device which has been predetermined may be used or it is also possible to construct in such a manner that processes in step S34 and subsequent steps are executed to all devices other than the first device and this processing loop is repeated until the device which can realize them is found out. In S34, the devices which can execute the finishing settings may be displayed as selection candidates of the second device. In such a case, the host computer compares the ability information of a plurality of devices connected to the host computer with function information necessary for the finishing process and displays the devices having all of the function information.

FIG. 16 is a flowchart for describing details of the process of step S39 in FIG. 15. In the flowchart, with respect to the settings which may be executed by any one of the first device and the second device, the host computer 100 divides the setting items so as to be executed by the first device.

In step S40, based on the ability information and the like, the host computer 100 extracts all of the settings which can be realized by the first device from the finishing settings of the document. Subsequently, in step S41, based on the ability information and the like, the host computer 100 extracts all of the setting items which cannot be realized by the first device from the finishing settings of the document.

The host computer 100 selects one of a plurality of the setting items extracted in step S40 and executes processes of steps S42 to S47 for the selected setting items. The processes of steps S42 to S47 are repetitively executed until all of the setting items are selected.

In step S43, the host computer 100 selects one of a plurality of the setting items extracted in step S41 and sequentially repeats the processes until all of the setting items are selected.

In step S44, with respect to the setting items (assumed to be A) selected in step S42 and the setting items (assumed to be B) selected in step S43, based on order information, the host computer 100 discriminates whether or not B can be executed after A. If B cannot be executed after A (NO in S44), in step S45, the host computer 100 removes the setting items A from the setting items extracted in step S40.

In the case where the setting items A extracted in step S40 may be executed prior to all of the setting items extracted in step S41 (YES in S44), the host computer 100 leaves A as they are as setting items which are executed by the first device. When the discrimination of all combinations are performed, the host computer 100 exits the loop and advances to step S48. In step S48, based on all of the setting items which are executed by the first device and the ability information of the first device, the host computer 100 changes the setting items in a range where they can be executed by the first device.

Further, in step S49, by the host computer 100, the setting items excluding the items which were determined that they should not be executed by the first device by the change in setting items in step S48 are set into the items which are executed by the first device.

Subsequently, in step S50, by the host computer 100, the setting items excluding the setting items which were determined to be executed by the first device in step S49 among the finishing setting items of the document are set into the items which are executed by the second device.

Subsequently, in step S51, based on the ability information and the like, the host computer 100 discriminates whether or not the setting items which have been decided in step S50 and are executed by the second device can be realized by the second device. If they can be executed by the second device, the host computer 100 finishes the processes illustrated in FIG. 16. If NO, the host computer 100 advances to step S52 and an error for notifying the user that the settings of the document cannot be realized by the first device and the second device which have been selected at present is displayed to, for example, the display apparatus 16 or the like.

FIG. 17 is a flowchart for describing details of another example of the process of step S39 in the flowchart of FIG. 15. In this flowchart, with respect to the settings which may be executed by any one of the first device and the second device, the host computer 100 divides the setting items so as to be executed by the second device.

In step S60, based on the ability information and the like, the host computer 100 extracts all of the settings which can be realized only by the first device from the finishing settings of the document. Subsequently, in step S61, based on the ability information and the like, the host computer 100 extracts all of the setting items which cannot be executed by the first device from the finishing settings of the document. Then, step S62 follows.

In steps S62 to S67, the host computer selects one of a plurality of setting items extracted in step S60 and sequentially repeats the processes until all of the setting items are selected.

In step S63, the host computer 100 selects one of a plurality of setting items extracted in step S61 and sequentially repeats the processes until all of the setting items are selected.

In step S64, with respect to the setting items (assumed to be A) selected in step S62 and the setting items (assumed to be a) selected in step S63, based on the order information, the host computer 100 discriminates whether or not a can be executed after A. If a cannot be executed after A, in step S65, the host computer 100 removes the setting items A from the setting items extracted in step S61. If a cannot be executed later with respect to all of the setting items extracted in step S61, the host computer 100 adds a to the setting items which are executed by the first device. When the discrimination of all combinations are performed, the host computer 100 exits the loop and advances to step S68. In step S68, the host computer 100 combines the setting items which have been extracted in step S60 and can be executed only by the first device and the items which were determined to be executed by the first device in a range of steps S61 to S67, thereby setting to setting items in the first device. Based on the setting items in the first device and the ability information of the first device, the host computer 100 executes a rounding process of the settings. As a rounding process, the rounding process which has been executed in the related art can be diverted.

Further, in step S69, the host computer 100 sets the setting items excluding the processes cut by the rounding process in step S68 into the items which are executed by the first device.

Subsequently, in step S70, by the host computer 100, the setting items other than the setting items which were determined to be executed by the first device in step S69 among the finishing setting items of the document are set into the items which are executed by the second device.

Subsequently, in step S71, based on the ability information and the like, the host computer 100 discriminates whether or not the setting items which have been decided in step S70 and are executed by the second device can be realized by the second device. If they can be realized by the second device, the host computer 100 finishes the processes illustrated in FIG. 17. If NO, the host computer 100 advances to step S72 and an error for notifying the user that the settings of the document cannot be realized by the first device and the second device which have been selected at present is displayed to, for example, the display apparatus 16 or the like.

If three devices can be used in FIGS. 16 and 17, in steps S49 and S69, the host computer 100 newly sets the settings which were decided to be not executed in the first device into the settings of the document. The host computer 100 allows the second device to repeat the processes of steps S40 to S49 and steps S60 to S69 and divides (separates) the items which are executed by the second device and the items which are executed by the third device.

Figure 18:
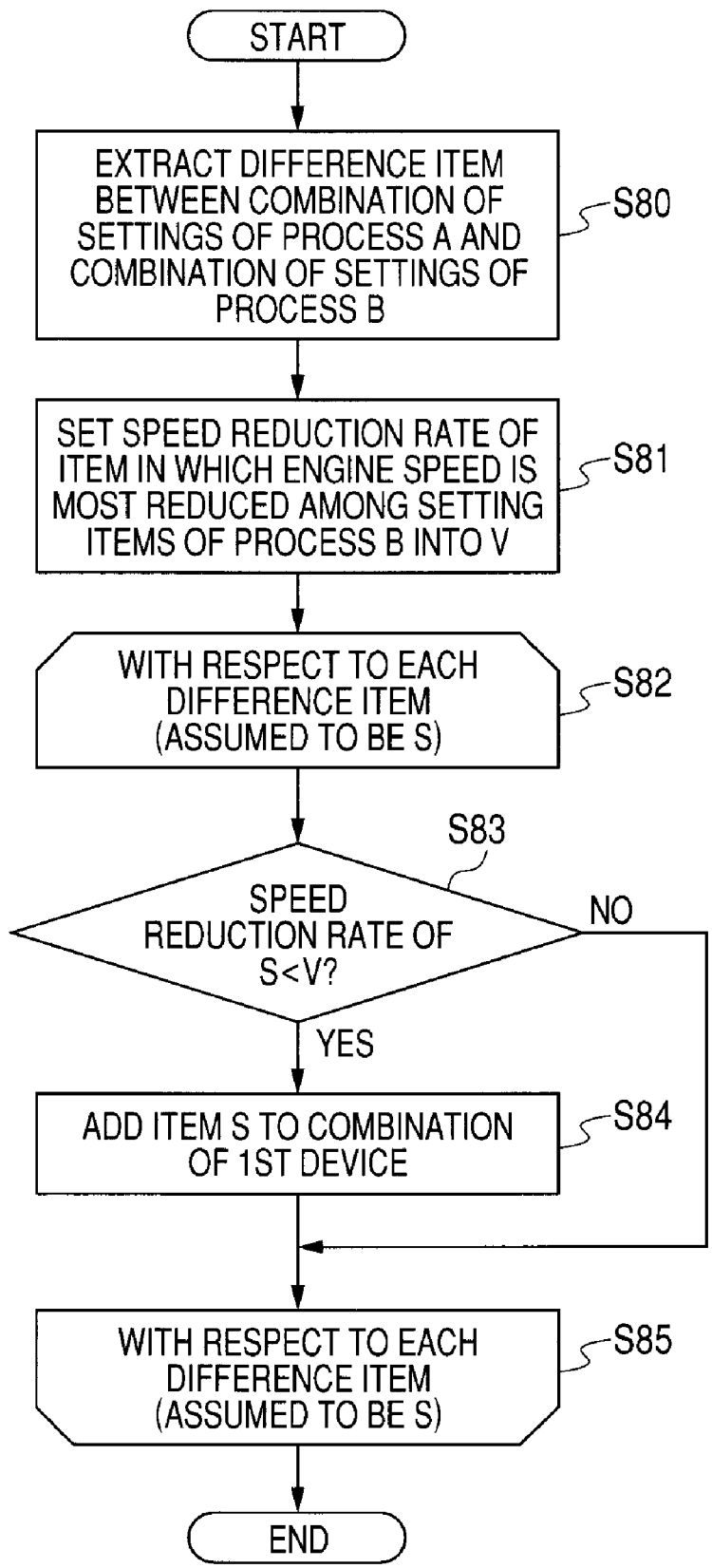
FIG. 18 us a flowchart illustrating an example of a process for dividing settings in such a manner that in the case where there are the settings which can be realized even if they are executed by any one of a first device and a second device, the larger number of setting items are executed by the first device while making the most of an engine speed of the first device.

FIG. 18 is a flowchart illustrating an example of the process for dividing the settings in such a manner that in the case where there are the settings which can be realized even if they are executed by any one of the first device and the second device, the larger number of setting items are executed by the first device while making the most of the engine speed of the first device.

In step S80, the host computer 100 extracts a difference between a group of items which were formed in the process in FIG. 16 (process A) and have been determined to be executed by the first device (device for executing the printing) and a group of items which were formed in the process in FIG. 17 (process B) and have been determined to be executed by the first device. The group of items which were formed in the process in FIG. 16 (process A) and have been determined to be executed by the first device (device for executing the printing) is assumed to be α. The group of items which were formed in the process in FIG. 17 (process B) and have been determined to be executed by the first device is assumed to be β.

The process A is a combination of the settings in the case where a large number of processes are executed as many as possible by the first device. The process B is a combination of the settings in the case where the number of setting items which are executed by the first device is reduced as much as possible. Therefore, the difference item is an item which may not be executed by the first device.

Subsequently, in step S81, the host computer 100 examines a speed reduction ratio of the setting item in which an engine speed of the first device is most reduced among the setting items included in β, and sets the speed reduction ratio to V. For example, the speed reduction ratio of each setting item may be predetermined in the host computer 100 or may be set (or stored) in the first device and the host computer 100 may obtain it by the first device.

In step S82, the host computer 100 sequentially repeats the processes until step S85 with respect to all difference items of α and β. When one of the difference items of α and β extracted in step S82 is assumed to be S, the host computer 100 compares the speed reduction ratio of S with V in step S83. If the speed reduction ratio of S is larger than V, the host computer 100 determines that if S is executed by the first device, the engine speed is further decreased, so that S is not executed in the first device. If NO, the host computer 100 advances to step S84 and adds S to β, thereby forming a new group of items which are executed by the first device.

The host computer 100 sets the items in which all S added in step S84 have been added to initial β into items to be executed by the first device.

FIG. 19 is a conceptual diagram of an example of a finishing ability table prepared by the system which is referred to in step S23 in FIG. 14. The setting items are previously divided into groups every category and a flag showing whether or not the finishing can be used when the printer is used as a near-line finisher every category is disclosed. In FIG. 19, it is disclosed that although the punch and staple can be used as a near-line finisher, an insertion of tab paper can be used only when it is used as a printer.

FIG. 20 is a diagram illustrating an example of ability information obtained by the host computer 100 from the device in step S10 in FIG. 13.

Not only information showing that the staple can be merely performed but also information (order information) regarding the order between the settings is also disclosed in the ability information illustrated in FIG. 20. The order information is referred to by the host computer 100 when discriminating whether or not the order between the settings can be realized in step S44 in FIG. 16 and in step S64 in FIG. 17. As order information, there is disclosed information showing that when an inline stapler is used as a near-line finisher which is not accompanied with the printing, in the case where the staple, saddle stitch, and case binding (case) have been executed in a pre-process of the device, it cannot be used, however, if the punch, cutting, and trimming have been executed in the pre-process of the device, it can be used, and the like.

There are two kinds of near-line punchers. Although a puncher A (near-line punch A) can be used even if the staple has been executed in the pre-process, a puncher B (near-line punch B) cannot be used if the staple has been performed in the pre-process.

Since information showing that the punch can be performed by the near-line finisher after the staple is disclosed in the ability information of the inline stapler, in the case of combining the stapler with the puncher B and using them, a contradiction occurs in the information. In such a case, the host computer 100 preferentially uses information of the apparatus serving as a post-process and discriminates whether or not the order is correct.

However, it is not always necessary to preferentially execute the post-process.

FIG. 21 is a diagram illustrating an example of device ability information obtained by the host computer 100 in the case where the number of new finishing kinds is increased.

Although a new device of what is called a C-folding is increased in the example of FIG. 21, the host computer 100 cannot obtain the order information of new finishing called a C-folding from the devices which have been introduced before that. In such a case, the host computer 100 discriminates a combination of the devices which are used based on the information obtained from a C-folding machine irrespective of the timing before or after the step.

Figure 22:
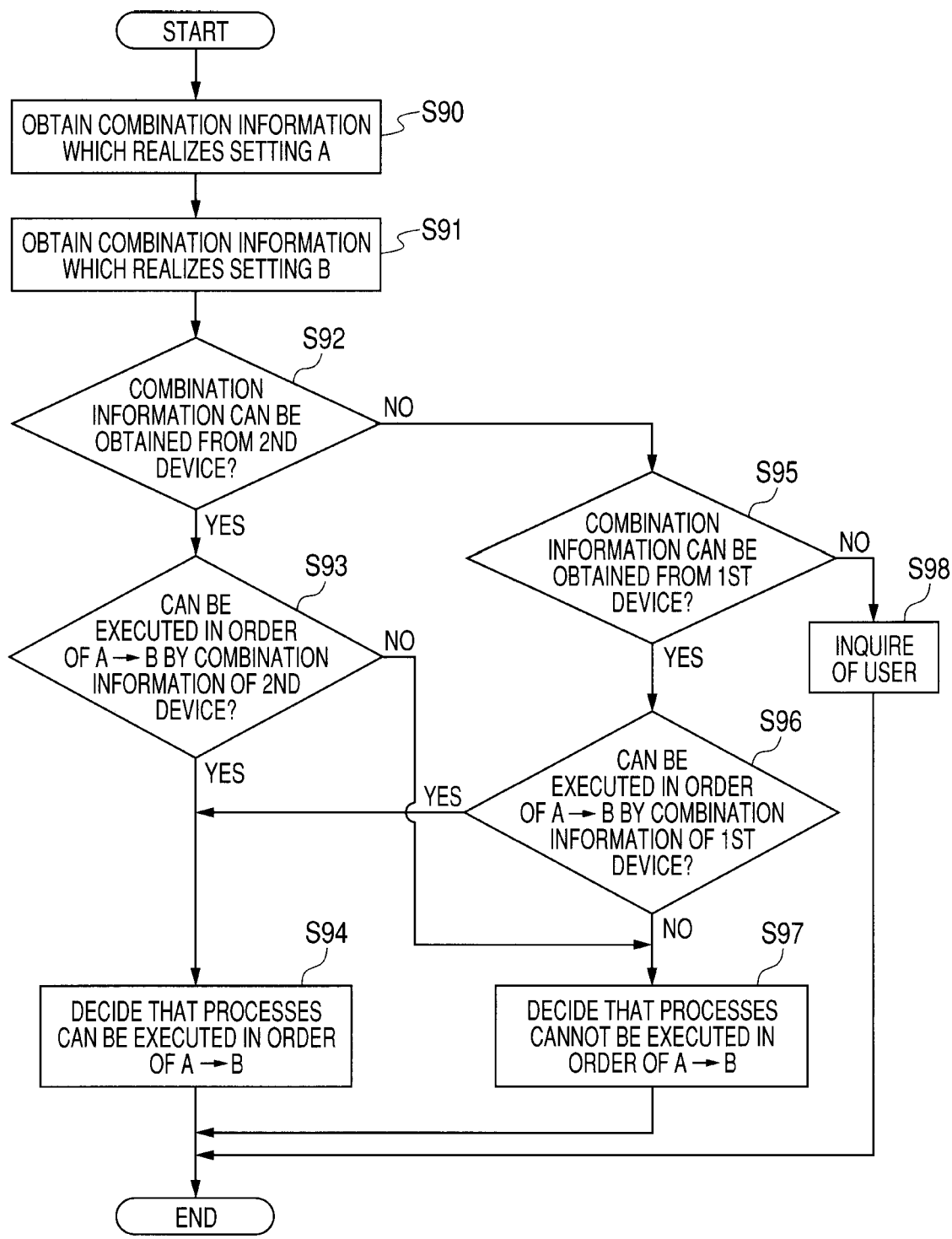
FIG. 22 is a flowchart for describing details of a process for discriminating whether or not order between settings can be realized in step S44 in FIG. 16 and step S64 in FIG. 17.

Subsequently, an example of the discriminating process about whether or not the order between the settings can be realized will be described by using FIG. 22. FIG. 22 is a flowchart for describing details of the process for discriminating whether or not the order between the settings can be realized in step S44 in FIG. 16 and step S64 in FIG. 17. In the example of FIG. 22, the setting items A and the setting items B exist and the host computer 100 discriminates whether or not the setting items B can be executed after the setting items A.

In step S90, the host computer 100 obtains information of a combination (combination information) of the devices which realize the setting items A from the ability information obtained from the first device. Subsequently, in step S91, the host computer 100 obtains combination information of the devices which realize the setting items B from the ability information obtained from the second device.

Subsequently, in step S92, the host computer 100 discriminates whether or not the combination information of the setting items A and the setting items B exists in the ability information obtained from the second device as a post-process. If the combination information exists, the host computer 100 advances to step S93. If the combination information does not exist, step S95 follows.

Subsequently, in step S93, based on the combination information (and the order information) obtained from the second device, the host computer 100 discriminates whether or not the finisher corresponding to the setting items B can be used if the setting items A have been executed in the pre-process. If information showing that even if the setting items A have been executed in the pre-process, the finisher corresponding to the setting items B can be used is disclosed in the combination information obtained from the second device, the host computer 100 advances to step S94. If NO, step S97 follows.

In step S94, the host computer 100 determines that the setting items B can be executed after the setting items A.

In step S95, the host computer 100 discriminates whether or not the combination information of the setting items A and the setting items B exists in the ability information obtained from the first device. If the combination information exists, the host computer 100 advances to step S96. If there is no combination information, step S98 follows.

In step S96, based on the combination information obtained from the first device, the host computer 100 discriminates whether or not the setting items B can be executed as a post-process of the finisher corresponding to the setting items A. If information showing that the setting items B can be executed as a post-process of the finisher corresponding to the setting items A is disclosed in the combination information obtained from the first device, the host computer 100 advances to step S94. If NO, step S97 follows.

In step S97, the host computer 100 determines that the setting items B cannot be executed after the setting items A.

In step S98, since the host computer 100 cannot obtain the combination information from any of the devices, it inquires of the user and sets a result of the inquiry to a discrimination result. In step S98, the host computer 100 does not inquire of the user but may determine that the combination of the setting items A and the setting items B cannot be realized.

Figure 23:
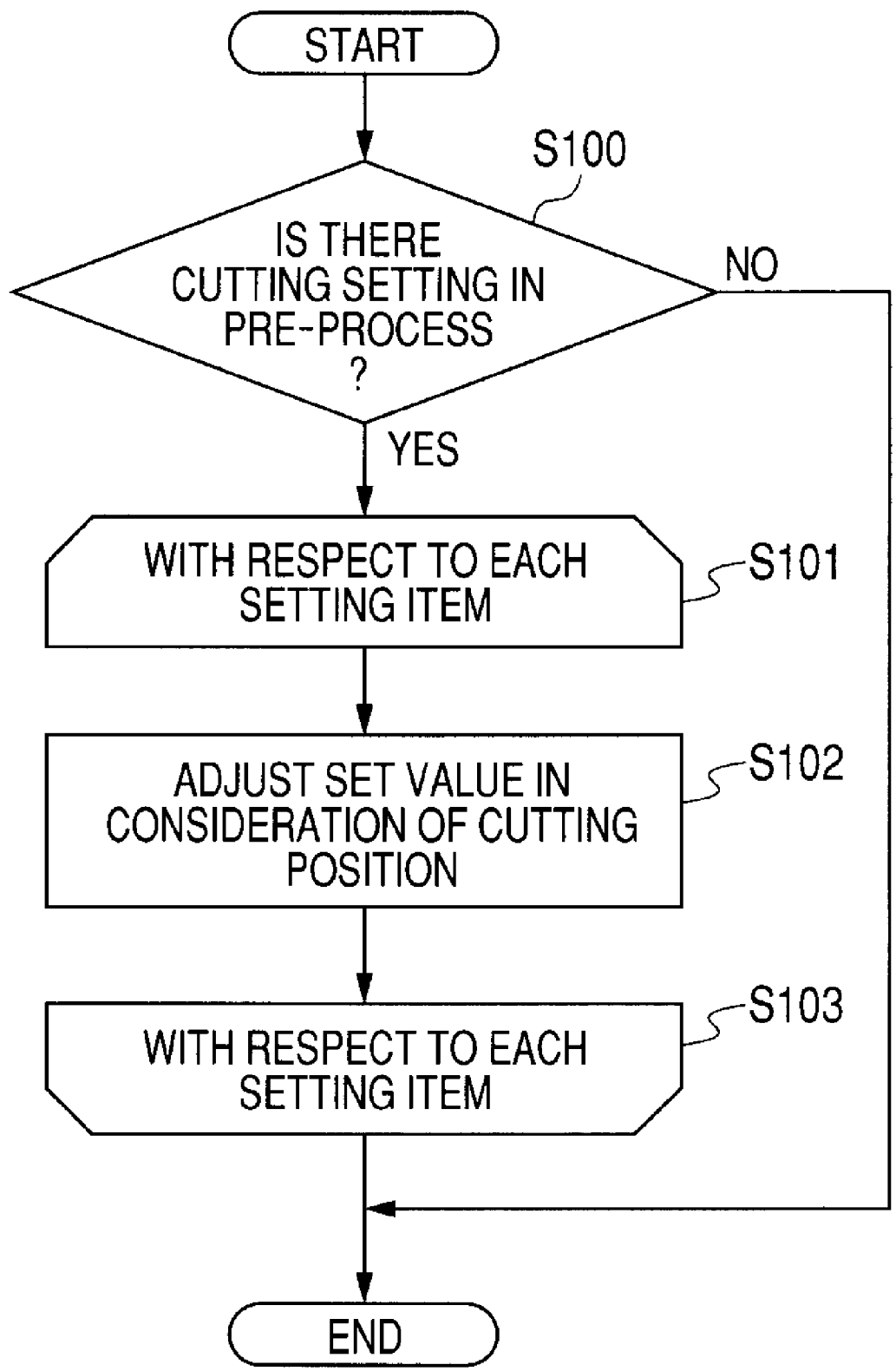
FIG. 23 is a flowchart illustrating an example of a schematic process in the case of changing the setting values in consideration of a cutting step.

FIG. 23 is a flowchart illustrating an example of a schematic process in the case of changing the setting values in consideration of the cutting step.

In step S100, the host computer 100 discriminates whether or not the cutting setting exists in the pre-process. If the cutting setting does not exist in the pre-process, the host computer 100 finishes the processes illustrated in FIG. 23 as they are. If the cutting setting exists, the processing routine advances to step S101.

In steps S101 to S103, the processes are repeated with respect to each of the setting items which are executed in the device. In step S102, the host computer 100 changes the setting values in consideration of the cutting position. Details of this process will be described with reference to FIG. 24.

Figure 24:
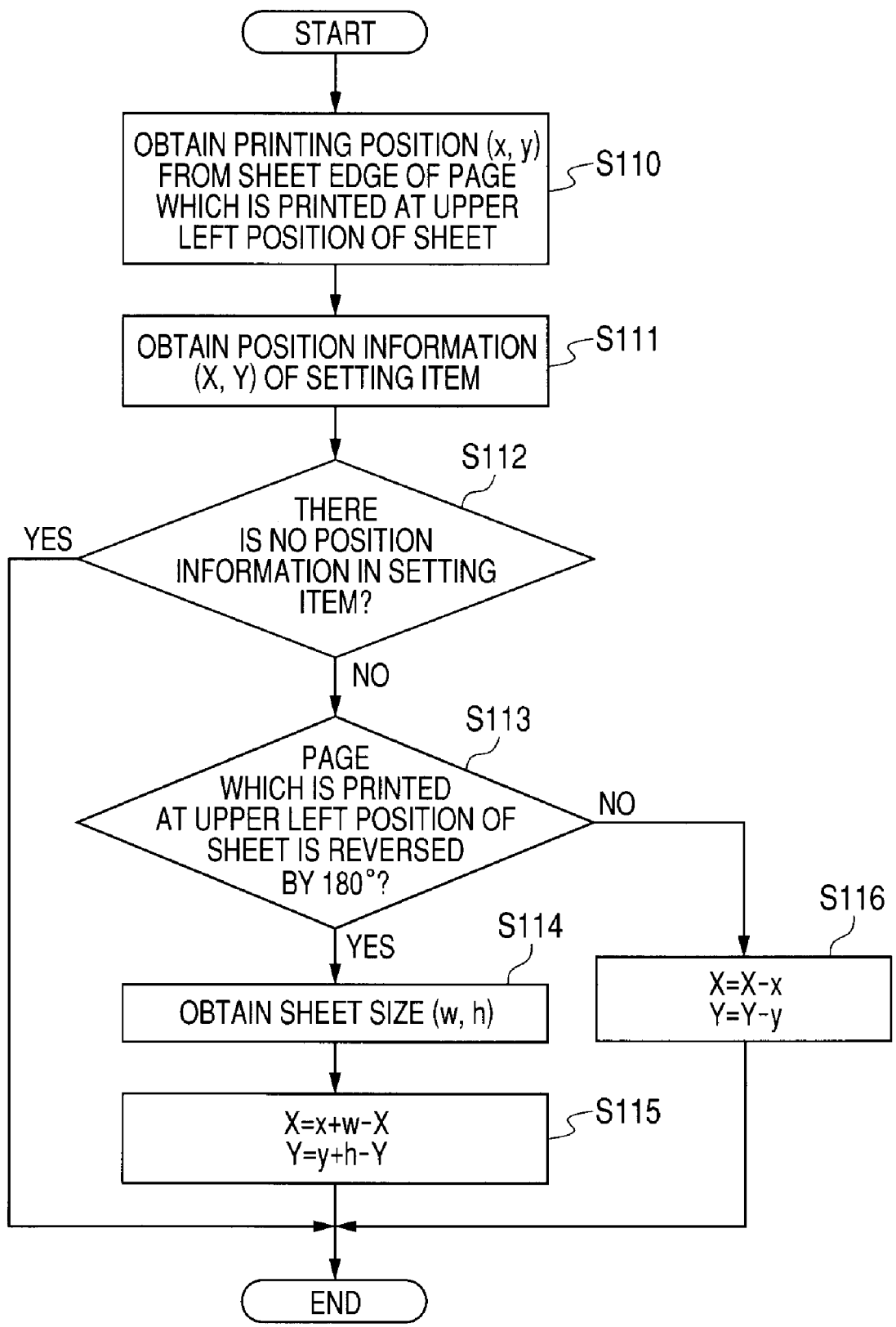
FIG. 24 is a flowchart illustrating an example of a setting value changing process in consideration of the cutting step.

FIG. 24 is a flowchart illustrating an example of a setting value changing process in consideration of the cutting step.

In step S110, the host computer 100 obtains offset values (x, y) from an upper left edge of the sheet of the page which is printed to the left upper position of the sheet. Each of x and y also indicates a cut amount from the left edge of the sheet. Subsequently, in step Sill, the host computer 100 obtains position information (X, Y) of the setting item which is being processed at present. Subsequently, in step S112, the host computer 100 discriminates whether or not the position information exists in the setting item which is being processed at present.

In the case of the setting item without the position information, since the position correction is unnecessary, the host computer 100 finishes the processes illustrated in FIG. 24. If NO, step S113 follows. In step S113, the host computer 100 discriminates whether or not the page which is printed to the left upper position of the sheet has been rotated by 180°. This is because in the case of such a setting as to cut only a boundary with the adjacent page instead of four peripheral sides of the page, there is a case where the page has been rotated in order to align cut ends. If the page has been rotated, the host computer 100 advances to step S114. If the page is not rotated, step S116 follows.

In step S114, the host computer 100 further obtains a width w and a height h of the sheet after it was cut. In the case where their values are not directly input in terms of the GUI, the host computer 100 needs to obtain them by calculating from the cutting position. In the case of a setting for dividing the sheet in two, assuming that a sheet size is equal to W and H (where, W<H), the host computer 100 can obtain their values by W=w and h=H/2. In the case of such a setting as to cut the four sides of the page, it is sufficient that the host computer 100 sets them so that a difference between the first cutting position from the left edge of the sheet and the second cutting position from the left edge of the sheet is equal to w and a difference between the first cutting position from the upper edge and the second cutting position from the upper edge is equal to h.

Subsequently, in step S115, the host computer 100 sets new setting positions X and Y as follows.

$X=x+w-X, Y=y+h-Y$

In step S116, the host computer 100 sets the new setting positions X and Y as follows.

$X=X-x, Y=Y-y$

Figure 25:
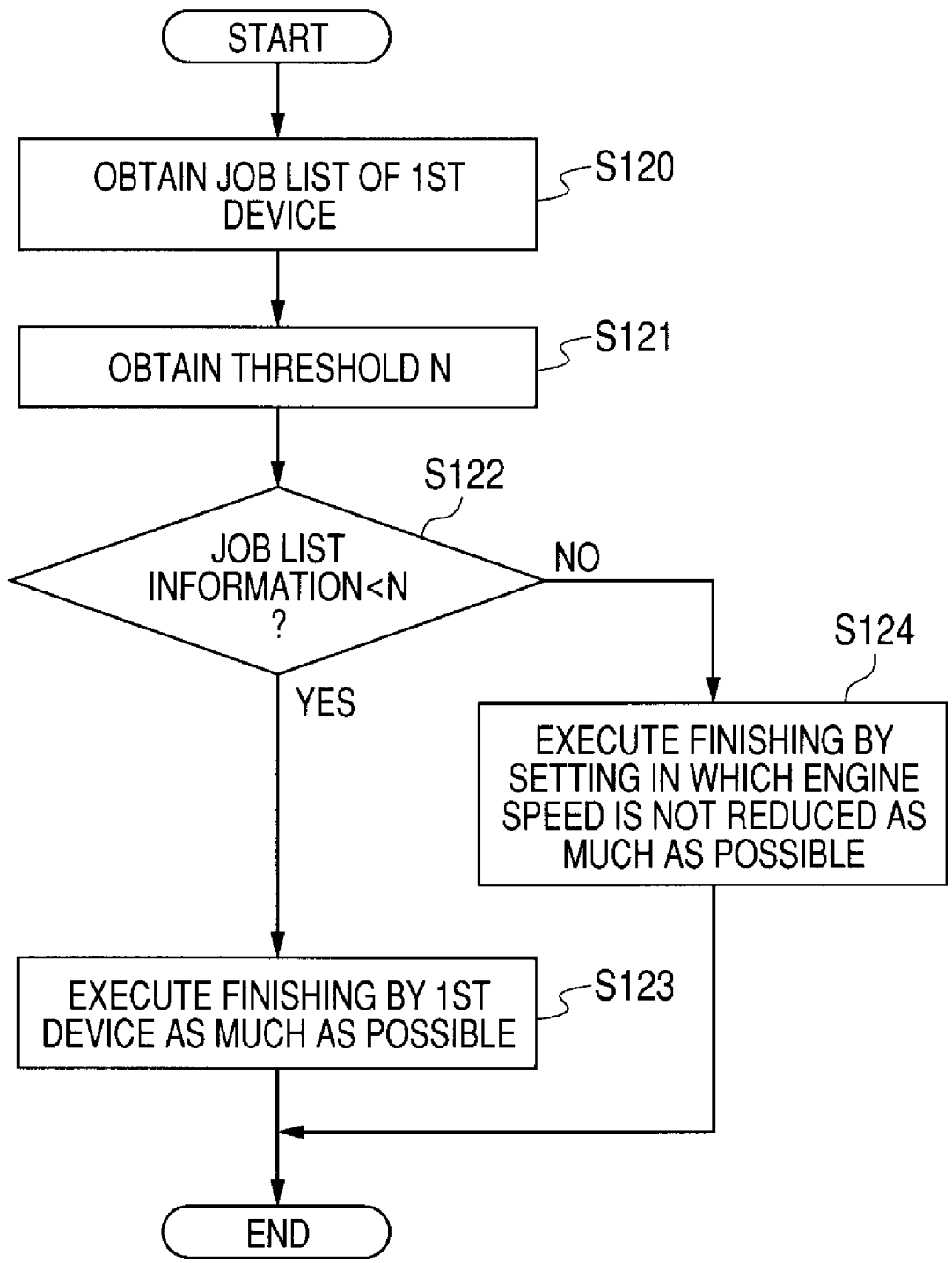
FIG. 25 is a flowchart illustrating an example of a process for changing a method of dividing the settings according to a situation of the job list.

FIG. 25 is a flowchart illustrating an example of a process for changing a method of dividing the settings according to a situation of the job list.

In step S120, the host computer 100 obtains a job list (job list information) of the first device for executing the printing (obtainment of job list information) Information such as the number of jobs, name of each job, the number of pages, the number of print copies, and the like is disclosed in the job list. Particularly, the number of jobs in the job list is used here. Subsequently, in step S121, the host computer 100 obtains a threshold value N. Although it is desirable for the user to previously designate the threshold value, a value held in the system as a default value may be used.

Further, in step S122, the host computer 100 compares the number of jobs in the job list obtained in step S120 with the threshold value N obtained in step S121. When N or more jobs remain in the first device, the host computer 100 determines that the device is busy, and advances to step S124. If the jobs of the number less than N remain, step S123 follows.

In step S123, the host computer 100 forms such a setting as to execute the finishing settings as many as possible by the first device illustrated above in FIG. 16 and executes such a setting. In step S124, the host computer 100 forms such a setting as to execute only the finishing settings in which the engine speed of the first device illustrated above in FIG. 18 is not decreased as much as possible and executes such a setting.

Although the example in which the host computer 100 uses the number of jobs as job list information has been described above, another information in the job list may be used. The host computer 100 may calculate the sum of products of the number of pages of each job and the number of print copies without merely limiting to the number of jobs and compare the sum with the threshold value. According to the invention, the processes regarding the print settings can be efficiently executed by a plurality of devices.

In the flowcharts illustrated in the embodiment, the processing steps before and after the target step can be exchanged so long as the processes do not become incomplete.

The embodiment may be applied to a system constructed by a plurality of apparatuses (for example, host computer, interface device, reader, printer, and the like) or may be applied to an apparatus (copying apparatus, printer, facsimile apparatus, or the like) constructed by one equipment.

Other Embodiments

The object of the invention is also accomplished by the following construction. That is, a storage medium (or recording medium) in which program codes of software for realizing the functions of the embodiments mentioned above have been recorded is supplied to a system or an apparatus. A central processing unit (CPU or MPU) of the system or the apparatus reads out and executes the program codes stored in the storage medium. In this case, the program codes themselves which were read out of the storage medium realize the functions of the embodiments mentioned above, and the storage medium in which the program codes have been recorded constructs the invention.

The central processing unit of the system or the apparatus executes the read-out program codes, so that an operating system (OS) or the like which is operating on the system or the apparatus executes a part or all of the actual processes based on instructions of the program codes. A case where the functions of the embodiments mentioned above are realized by those processes is also incorporated.

Further, it is assumed that the program codes read out of the storage medium are written into a memory provided for a function expanding card inserted in the system or the apparatus or for a connected function expanding unit. After that, a CPU or the like equipped for the function expanding card or the function expanding unit executes a part or all of the actual processes based on the instructions of the program codes, and a case where the functions of the embodiments mentioned above are realized by those processes is also incorporated.

In the case of applying the invention to the storage medium, the program codes corresponding to the flowcharts described above are stored into the storage medium (computer-readable storage medium).

According to each of the foregoing embodiments, the processes regarding the print settings can be efficiently executed by a plurality of devices. According to each of the foregoing embodiments, when the settings of the document are realized by using the inline finisher and other devices, a situation in which such a setting that the devices in the post-process cannot be used is executed in the pre-process can be prevented.

Although the exemplary embodiments of the invention have been described in detail above, the invention is not limited to the foregoing specific embodiments but many modifications and variations of the invention are possible within the scope of the essence of the invention disclosed in Claims.

This application claims the benefit of Japanese Patent Application No. 2008-166164, filed Jun. 25, 2008, which is hereby incorporated by reference in its entirety.

What is claimed is:

1. An information processing apparatus comprising:
   a setting unit that sets (i) print setting information applied to a document upon printing and (ii) finishing information applied to a printed matter of the document;
   a designating unit that designates a first printing apparatus in order to execute the printing;
   a transmitting unit that, in the case where the first printing apparatus designated by the designating unit can execute a process regarding the finishing information set by the setting unit, transmits print data including the print setting information and the finishing information to the first printing apparatus; and
   a second designating unit that, in the case where the first printing apparatus cannot execute the process regarding the finishing information set by the setting unit, designates a second printing apparatus for executing the process regarding the finishing information, wherein the transmitting unit transmits the print data including the print setting information to the first printing apparatus and transmits the print data including the finishing information to the second printing apparatus.

2. A control method comprising:
   setting (i) print setting information applied to a document upon printing and (ii) finishing information applied to a printed matter of the document;
   designating a first printing apparatus in order to execute the printing;
   in the case where the designated first printing apparatus can execute a process regarding the set finishing information, transmitting print data including the print setting information and the finishing information to the first printing apparatus; and
   in the case where the first printing apparatus cannot execute the process regarding the set finishing information, designating a second printing apparatus for executing the process regarding the finishing information, wherein, the print data including the print setting information is transmitted to the first printing apparatus and the print data including the finishing information is transmitted to the second printing apparatus.

3. A non-transitory computer-readable storage medium which stores a program for allowing an information processing apparatus to execute a control method comprising:
   setting (i) print setting information applied to a document upon printing and (ii) finishing information applied to a printed matter of the document;
   designating a first printing apparatus in order to execute the printing;
   in the case where the designated first printing apparatus can execute a process regarding the set finishing information, transmitting print data including the print setting information and the finishing information to the first printing apparatus; and
   in the case where the first printing apparatus cannot execute the process regarding the set finishing information, designating a second printing apparatus for executing the process regarding the finishing information, wherein, the print data including the print setting information is transmitted to the first printing apparatus and the print data including the finishing information is transmitted to the second printing apparatus.

* * * * *